(12) United States Patent
Yamagata

(10) Patent No.: US 7,502,365 B2
(45) Date of Patent: Mar. 10, 2009

(54) WIRELESS COMMUNICATION APPARATUS, WIRELESS COMMUNICATION METHOD, AND COMPUTER-READABLE STORAGE MEDIUM

(75) Inventor: Tomonari Yamagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 443 days.

(21) Appl. No.: 11/342,664

(22) Filed: Jan. 31, 2006

(65) Prior Publication Data

US 2006/0193274 A1    Aug. 31, 2006

(30) Foreign Application Priority Data

Feb. 9, 2005    (JP) ............................ P2005-032693

(51) Int. Cl.
*H04Q 7/24*    (2006.01)
(52) U.S. Cl. ...................................... 370/366; 370/345
(58) Field of Classification Search ................ None
See application file for complete search history.

(56) References Cited

U.S. PATENT DOCUMENTS

2004/0100936 A1* 5/2004 Liu et al. .................... 370/345
2004/0151144 A1* 8/2004 Benveniste .................. 370/336
2005/0239474 A9* 10/2005 Liang .......................... 455/454

FOREIGN PATENT DOCUMENTS

JP    10-173663    6/1998

* cited by examiner

*Primary Examiner*—Erika A Gary
(74) *Attorney, Agent, or Firm*—Finnegan, Henderson, Farabow, Garrett & Dunner, L.L.P.

(57) ABSTRACT

A wireless communication apparatus includes a random number range holding unit configured to hold a random number range, a random time setting unit configured to set a random time based on the random number range, a random time counting unit configured to count the random time starting from a particular time only when the radio communication channel is not used, a transmitting unit configured to transmit data via the radio communication channel when counting of the random time was completed, a time counting unit configured to count a particular time, and a random number range control unit configured to control the random number range such that when data transmitted by the transmitting unit over the radio communication channel collides with another data, the random number range is expanded, while when the particular time has been counted by the time counting unit, the random number range is initialized.

13 Claims, 15 Drawing Sheets

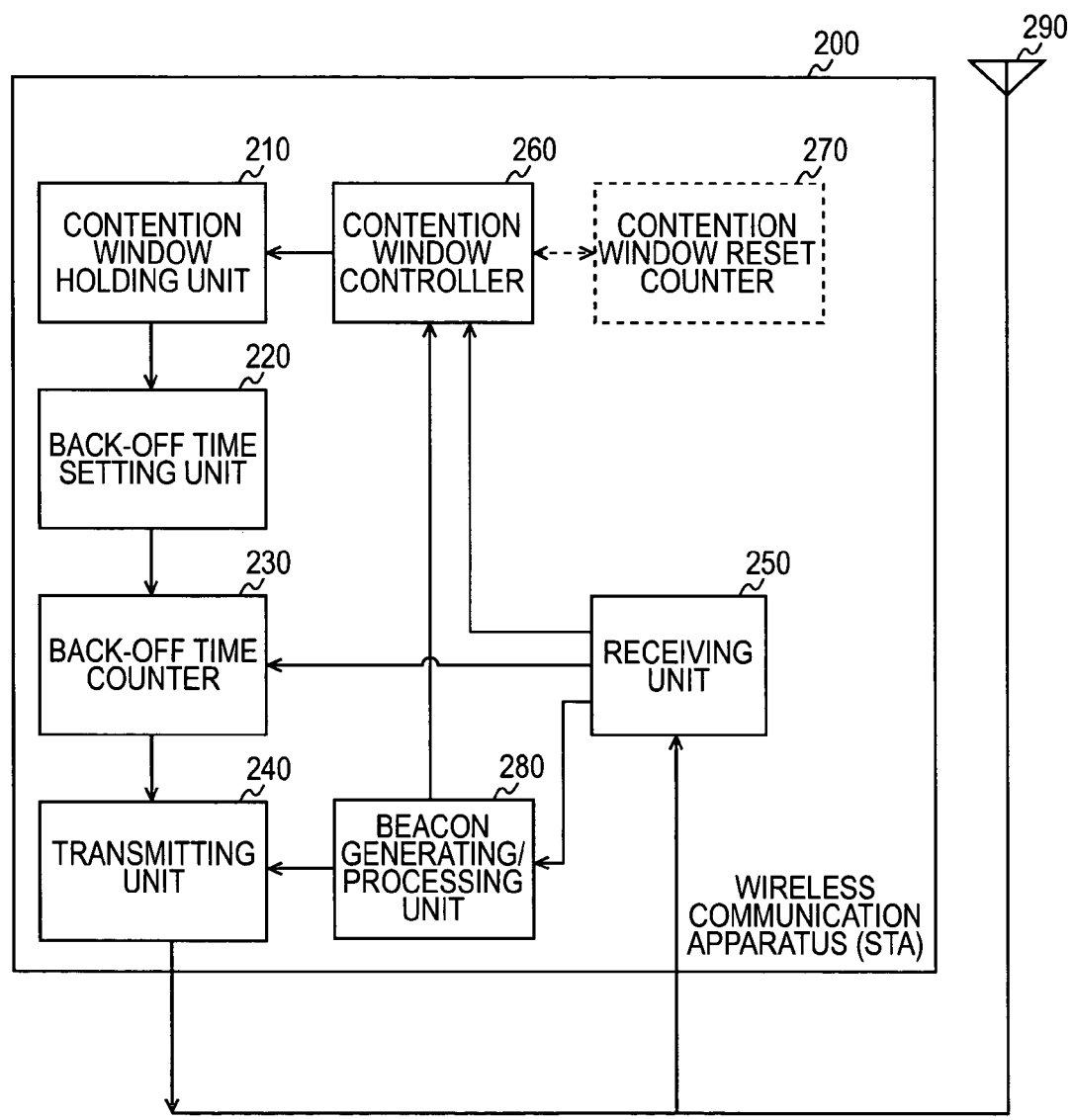

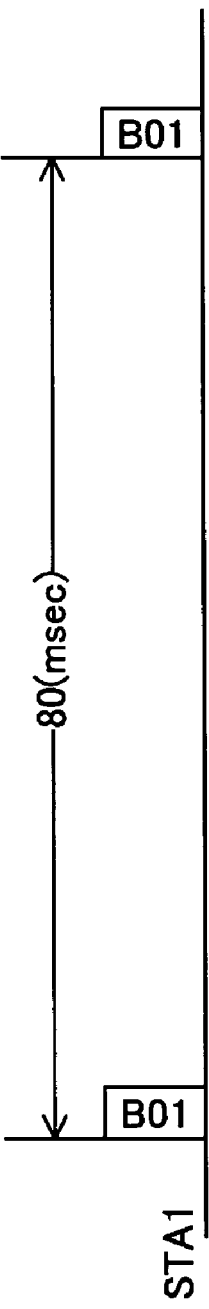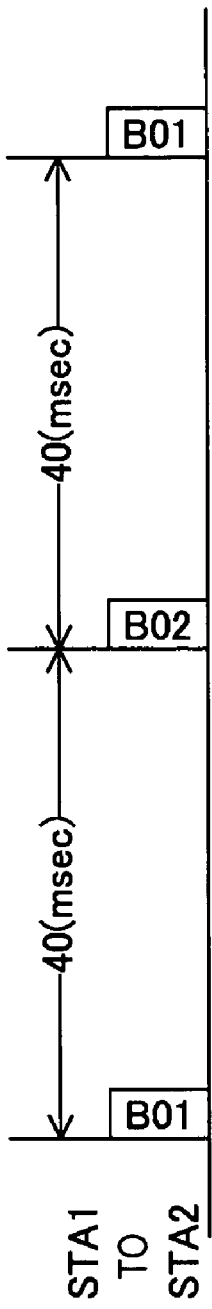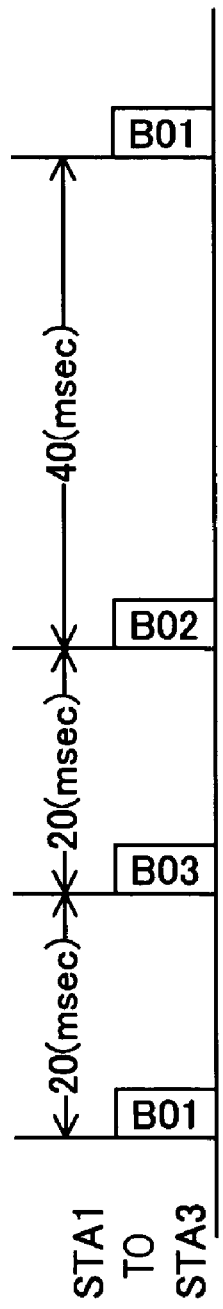

WIRELESS COMMUNICATION APPARATUS, WIRELESS COMMUNICATION METHOD, AND COMPUTER-READABLE STORAGE MEDIUM

CROSS REFERENCES TO RELATED APPLICATIONS

The present invention contains subject matter related to Japanese Patent Application JP 2005-032693 filed in the Japanese Patent Office on Feb. 9, 2005, the entire contents of which are incorporated herein by reference.

BACKGROUND OF THE INVENTION

1. Field of the Invention

The present invention relates to a wireless communication apparatus, a wireless communication method, and a program for causing a computer to execute the wireless communication method, which allow a plurality of wireless communication apparatus on a wireless communication network to transmit data at data transmission intervals that are controlled according to an autonomous distributed control scheme so as to achieve high overall throughput of a communication system.

2. Description of the Related Art

In recent years, an improvement in the transmission rate of a wireless LAN system and a reduction in cost have been achieved, and, as a result, the wireless LAN system has become very popular in a wide variety of applications, and many new applications have been proposed. For example, a personal area network (PAN) has been proposed to realize a mall-sized wireless network that allows a plurality of electronic devices located around a user to communicate with each other. For the above purpose, there have been proposed various wireless communication systems using various frequency bands such as a 2.4 GHz band or a 5 GHz band that do not need a particular license for use.

Widely used standards for wireless communication networks are IEEE (the Institute of Electrical and Electronics Engineers) 802.11, HiperLAN/2, IEEE802.15.3, and Bluetooth. The IEEE 802.11 standard has extended standards such as IEEE802.11a, b, and g for various wireless communication modes and frequency bands.

For a wireless local area network, two communication modes are known: an infrastructure mode; and an ad hoc mode.

In the infrastructure communication mode, a wireless communication apparatus called an access point (AP) is installed in an area, and communication via a network is performed under the general control of the access point. More specifically, when a certain communicating station (a wireless communication apparatus) wants to transmit data, the communication stations requests the access point to reserve a band for use by the communication station to transmit the data without having a collision with data transmitted by other communication stations. This method is called a bandwidth reservation protocol. In this communication protocol, communication stations on the wireless communication network communicate synchronously with each other via the access point. In asynchronous communication between sending and receiving communication stations in such an infrastructure wireless communication system, because the communication is performed via the access point, it is difficult to use the transmission channel in an efficient manner.

On the other hand, in the ad hoc wireless communication mode, communication stations directly communicate with each other in an asynchronous manner. Because arbitrary communication stations are allowed to directly communicate with each other without using a particular access point, the ad hoc wireless communication mode is suitable in particular for a home network for communication among home appliances. In the ad hoc mode, even if a failure occurs in some communication station or electric power of some communication station is turned off, routing is automatically changed so as to adapt to the new situation, and thus the total network can still work. By hopping a packet from a communication station to another a plurality of times, it is possible to transmit data to a relatively distant location at a high transmission rate.

A typical media access control protocol for data transmission via a wireless network is the CSMA (Carrier Sense Multiple Access) protocol. In the CSMA protocol, multiple accessing based on carrier sensing is allowed. In wireless communication, it is difficult for a wireless communication apparatus to receive a signal transmitted from the communication apparatus itself. Therefore, in wireless communication, instead of employing CSMA/CD (Carrier Sense Multiple Access with Collision Detection) employed in Ethernet (registered trademark), CSMA/CA (Carrier Sense Multiple Access with Collision Avoidance) is employed to avoid a collision. More specifically, in the CSMA/CA, a check is first performed as to whether no data is being transmitted from other wireless communication apparatus, and data is transmitted when no data being transmitted from other wireless communication apparatus is detected. The CSMA protocol is suitable for asynchronous communication for transferring files or transmitting e-mails.

In the IEEE802.11 standard, the CSMA/CA protocol is employed as a protocol for wireless channel access using the DCF (Distribution Coordination Function). When data is transmitted using the DCF, it is needed to check the usage status of a wireless communication channel (by performing media sensing) for a period equal to a predetermined frame interval (called a DIFS (DCF interface space)) plus a random time (called a back-off time) set for a wireless communication apparatus to confirm that no data is being transmitted from other wireless communication apparatus. The back-off time is given by the product of a random number generated within a predetermined range called a contention window (CW) ($CWmin \leq CW \leq CWmax$) and a unit time called a slot time.

Because the DIFS is set to a fixed value, if an equal back-off time is set for a plurality of wireless communication apparatus, there is a high probability that data is transmitted at the same time from the plurality of wireless communication apparatus and a data collision occurs on a wireless communication channel. In the CMSA/CA protocol, to avoid the above problem, the contention window value assigned for each wireless communication apparatus is doubled each time the wireless communication apparatus retransmits data to reduce the probability that the back-off time is set to a value equal to that for another wireless communication apparatus thereby reducing the probability that a data collision occurs. If a wireless communication apparatus succeeds in retransmitting data, an ACK signal indicating that the data has been successfully received is transmitted from a destination of data. In response to receiving the ACK signal, the contention window is initialized.

On the other hand, in the case of a wireless LAN system using a UWB (Ultra Wide Band) communication technique, it takes a long time to detect a preamble, and thus there is a high probability that a collision occurs. As a result, frequent retransmission of data occurs, which results in a reduction in the overall throughput of the system. To avoid the above problem, it is known to increase the contention window value depending on the number of wireless communication apparatus currently existing on a network thereby decreasing the probability that a collision occurs (see, for example, Japanese Unexamined Patent Application Publication No. 10-173663). In this technique, because the contention window value is increased with the number of the wireless communication apparatus, back-off times set to respective wireless communication apparatus are scattered over the increased contention window, and thus a reduction in the collision probability is achieved.

SUMMARY OF THE INVENTION

However, in a communication system in which a plurality of wireless communication apparatus transmit data over a wireless communication channel, avoidance of collision can result in a reduction in the overall throughput of a communication system.

In the technique in which the contention window is initialized in response to receiving an ACK signal, when a wireless communication apparatus transmits data further after a success of retransmission of data, the contention window is set to the initial value CWmin and thus the back-off time is set to a small value. As a result, there is a possibility that the wireless communication apparatus again encounters a collision if the total traffic of the system is high.

In a case in which a wireless communication apparatus finally succeeds in retransmitting data after a collision has occurred a large number of times between two wireless communication apparatus, the back-off time for the wireless communication apparatus that succeeded in data retransmission is set based on the contention window reset to the initial value CWmin, but the contention window for the other wireless communication apparatus remains at the expanded value. That is, one wireless communication apparatus has a small back-off time compared to the back-off time assigned to the other wireless communication apparatus, and thus there is a high probability that the network is used exclusively for a long time by the wireless communication apparatus that succeeded in data retransmission, that is, an opportunity of using the network is not equally given to all wireless communication apparatus.

On the other hand, in the technique (such as that disclosed, for example, in Japanese Unexamined Patent Application Publication No. 10-173663) in which the contention window value is determined depending on the number of wireless communication apparatus detected as existing on a network, it is difficult to dynamically determine the contention window value in response to a quick change in the traffic volume. That is, because the contention window value is determined depending on the number of wireless communication apparatus existing on the network, the amount of data flowing over the system is not constant, and this can cause a reduction in data transmission efficiency, in particular when the average traffic is low although the traffic becomes high only for a very short period. Besides, in this technique, it is needed to manage the operation status of all wireless communication apparatus. Therefore, the size of a management table used to manage the operation status increases with the number of wireless communication apparatus, and the traffic for managing the wireless communication apparatus increases with the number of wireless communication apparatus.

In view of the above, the present invention provides a wireless communication apparatus, a wireless communication method, and a program for causing a computer to execute the wireless communication method, which control data transmission intervals in a wireless communication system in which a plurality of wireless communication apparatus transmit data based on the DCF so that high overall throughput of the system can be achieved.

According to an embodiment of the present invention, there is provided a wireless communication apparatus including random number range holding means for holding a random number range, random time setting means for setting a random time based on the random number range, random time counting means for counting the random time starting from a particular time only when the radio communication channel is not used, transmission means for transmitting data via the radio communication channel when counting of the random time by the random time counting means was completed, time counting means for counting a particular time, and random number range control means for controlling the random number range such that when data transmitted by the transmission means over the radio communication channel collides with another data, the random number range is expanded, while when the particular time has been counted by the time counting means, the random number range is initialized. In this wireless communication apparatus, as described above, the random number range is initialized not immediately after successful retransmission of data but at particular time intervals so that the data transmission interval is controlled to a proper value that allows the data to be transmitted efficiently thereby achieving high throughput.

More specifically, the time counting means sets the counting time to a proper value depending on the number of wireless communication apparatus existing on the wireless communication network and performing communication via the radio communication channel so that the random number range is initialized at time intervals optimized depending on the number of wireless communication apparatus existing on the wireless communication network and thus the data transmission interval is controlled to a proper value that allows the data to be transmitted efficiently thereby achieving high throughput.

Note that the wireless communication apparatus may be realized, for example, by a wireless communication apparatus 100 in specific embodiments which will be described later. The random number range holding means may be realized, for example, by a contention window holding unit 110. The random time setting means may be realized, for example, by a back-off time setting unit 120. The random time counting means may be realized, for example, by a back-off time counter 130. The transmission means may be realized, for example, by a transmitting unit 140. The time counting means may be realized, for example, by a contention window reset counter 170. The random number range control means may be realized, for example, by a contention window controller 160.

According to an embodiment of the present invention, there is provided a wireless communication apparatus including random number range holding means for holding a random number range, random time setting means for setting a random time based on the random number range, random time counting means for counting the random time starting from a particular time only when the radio communication channel is not used, beacon information generation means for generating beacon information at predetermined time intervals to inform other wireless communication apparatus in a wireless communication network based on a distribution coordination function of the presence of the wireless communication apparatus, transmission means for transmitting the beacon information at the predetermined intervals and transmitting data via the radio communication channel when counting of the random time by the random time counting means was completed, and random number range control means for controlling the random number range such that when data transmitted by the transmission means over the radio communication channel collides with another data, the random number range is expanded, while when the transmission means transmits the beacon information, the random number range is initialized. In this wireless communication method, as described above, the random number range is initialized not immediately after successful retransmission of data but at a time at which beacon information is transmitted so that the data transmission interval is controlled to a proper value that allows the data to be transmitted efficiently thereby achieving high throughput.

The wireless communication apparatus may further include time counting means for counting a particular time, and the random number range control means may initialize the random number range when the beacon information is transmitted or when counting of the particular time by the time counting means was completed. This makes it possible to initialize the random number range at a proper time in accordance with the counting by the time counting means even in a case in which beacon information is transmitted at long intervals.

The time counting means may be initialized, when a particular time has elapsed or when the beacon information is transmitted. This makes it possible to initialize the random number range whenever a predetermined time has elapsed since a beacon was transmitted, so that the data transmission intervals are maintained within an optimum range.

The particular time may be set depending on the number of other wireless communication apparatus existing on the wireless communication network. That is, by controlling the time intervals at which to initialize the random number range depending on the number of wireless communication apparatus existing on the wireless communication network, it is possible to optimize the data transmission intervals.

The information associated with the number of other wireless communication apparatus existing on the wireless communication network may be included in the beacon information. In this case, by examining the beacon information, it is possible to detect the number of wireless communication apparatus existing on the wireless communication network.

The wireless communication apparatus may be realized, for example, a wireless communication apparatus 200 in specific embodiments which will be described later. The random number range holding means may be realized, for example, by a contention window holding unit 210. The random time setting means may be realized, for example, by a back-off time setting unit 220. The random time counting means may be realized, for example, by a back-off time counter 230. The beacon information generating/processing means may be realized, for example, by a beacon generating/processing unit 280. The transmission means may be realized, for example, by a transmitting unit 240. The random number range control means may be realized, for example, by a contention window controller 260.

The beacon information may be a beacon B01, B02, or B03 in the specific embodiments described later.

The time counting means may be realized, for example, by a contention window reset counter 270.

According to an embodiment of the present invention, there is provided a wireless communication apparatus adapted to perform wireless communication over a wireless communication network based on a distribution coordination function in which there is provided a transmission prioritized period in which the wireless communication apparatus has a preferential right to transmit data and there is also provided a fairy access period in which the wireless communication apparatus has a competition in terms of transmission of data with another wireless communication apparatus, the wireless communication apparatus including random number range holding means for holding a random number range, random time setting means for setting a random time based on the random number range, random time counting means for counting the random time starting from a particular time only when the radio communication channel is not used, transmission means for, in the fairy access period, transmitting data via the radio communication channel when counting of the random time by the random time counting means was completed, and random number range control means for controlling the random number range such that when data transmitted by the transmission means over the radio communication channel collides with another data, the random number range is expanded, while when the transmission prioritized period is given to the present wireless communication apparatus, the random number range is initialized. In the period in which the wireless communication apparatus has a preferential right to transmit data, the random time is set based on the random number range with the initial value so that the data transmission interval is controlled to a proper value that allows the data to be transmitted efficiently thereby achieving high throughput.

The wireless communication apparatus may further include time counting means for counting a particular time, and the random number range control means may initialize the random number range when the transmission prioritized period is given to the present wireless communication apparatus or when counting of the predetermined time by the time counting means was completed. This makes it possible that when the transmission prioritized period is given at long intervals, the random number range is initialized at shorter and proper intervals counted by the time counting means thereby maintaining the data transmission intervals within a proper range.

In this wireless communication apparatus, the time counting means may be initialized, when counting of the particular time was completed or when the transmission prioritized period is given to the present wireless communication apparatus. This makes it possible that the random number range is initialized whenever the particular time has elapsed since the transmission prioritized period was given to the wireless communication apparatus, and thus the data transmission intervals are maintained within a proper range.

In this wireless communication apparatus, the particular time may be set depending on the number of other wireless communication apparatus existing on the wireless communication network. This makes it possible to initialize the random number range at intervals depending on the number of wireless communication apparatus existing on the wireless communication network so that the data transmission intervals are maintained within a proper range and thus the system has high overall throughput.

The random number range holding means may be realized, for example, by a contention window holding unit 310 in specific embodiments which will be described later. The random time setting means may be realized, for example, by a back-off time setting unit 320. The random time counting means may be realized, for example, by a back-off time counter 330. The transmission means may be realized, for example, by a transmitting unit 340. The random number range control means may be realized, for example, by a contention window controller 360.

The transmission prioritized period may be given as a TPP in embodiments described later, and the fairy access period may be given as a FAP.

The time counting means may be realized, for example, by a contention window reset counter 370.

According to an embodiment of the present invention, there is provided a wireless communication method including the steps of holding a random number range, setting a random time based on the random number range, counting the random time starting from a particular time only when the radio communication channel is not used, transmitting data via the radio communication channel when counting of the random time was completed, expanding the random number range when the transmitted data collides with another data on the radio communication channel, and counting a particular time and initializing the random number range whenever the particular time has been counted. In this wireless communication method, as described above, the random number range is initialized not immediately after successful retransmission of data but at particular time intervals so that the data transmission interval is controlled to a proper value that allows the data to be transmitted efficiently thereby achieving high throughput.

According to an embodiment, there is provided a program for causing a computer to execute a wireless communication method including the steps of holding a random number range, setting a random time based on the random number range, counting the random time starting from a particular time only when the radio communication channel is not used, transmitting data via the radio communication channel when counting of the random time was completed, expanding the random number range when the transmitted data collides with another data on the radio communication channel, and counting a particular time and initializing the random number range whenever the particular time has been counted, In this wireless communication method, as described above, the random number range is initialized not immediately after successful retransmission of data but at particular time intervals so that the data transmission interval is controlled to a proper value that allows the data to be transmitted efficiently thereby achieving high throughput.

In the wireless communication method and the program therefor, the step of holding the random number range may be realized, for example, by step S922 or S924 in specific embodiments which will be described later. The step of setting the random time based on the random number range may be realized, for example, by step S911. The step of counting the random time starting from the particular time only when the radio communication channel is not used may be realized, for example, by step S914. The step of transmitting data via the radio communication channel when counting of the random time was completed may be realized, for example, by step S915. The step of expanding the random number range when the transmitted data collides with another data on the radio communication channel may be realized, for example, by step S917. The step of counting the particular time and initializing the random number range whenever the particular time has been counted may be realized, for example, by step S924.

As described above, the present invention provides the advantage that the data transmission intervals are properly controlled so that data is transmitted in the efficient manner that results in an increase in the overall throughput of the system.

Note that the process of initializing the contention window according to any embodiment of the present invention may be regarded as a method including a sequence of processing steps, and the method may be implemented in the form of a program that causes a computer to execute the sequence of processing steps. The program may be stored on a storage medium.

BRIEF DESCRIPTION OF THE DRAWINGS

FIG. 8 is a functional block diagram of a wireless communication apparatus according to an embodiment of the present invention;

FIGS. 9A to 9C are diagrams showing beacon transmission processes performed by wireless communication apparatus according to an embodiment of the present invention;

DESCRIPTION OF THE PREFERRED EMBODIMENTS

The present invention is described in further detail below with reference to embodiments in conjunction with the accompanying drawings.

First Embodiment

Figure 1A:
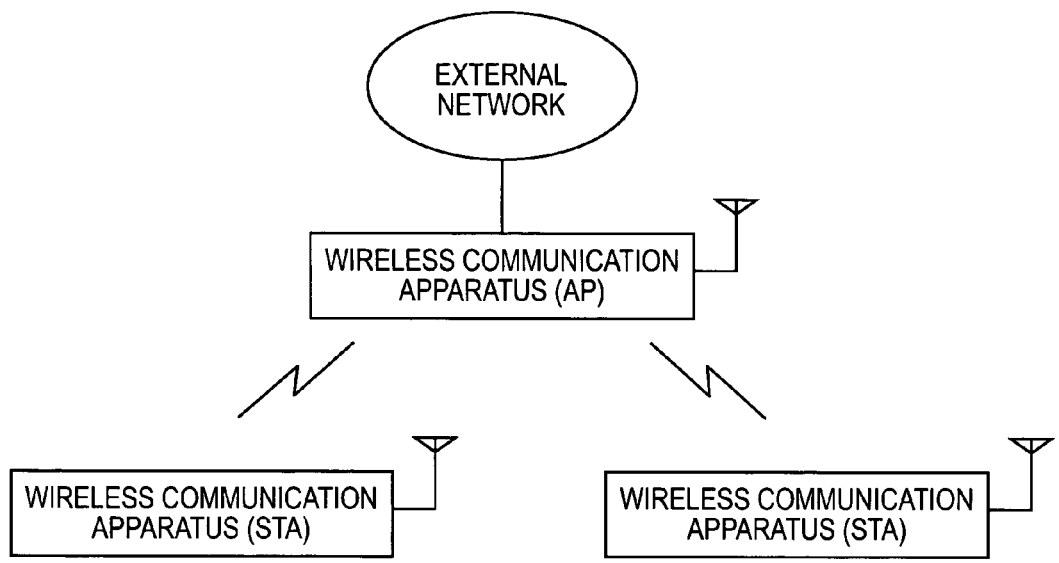
FIGS. 1A and 1B are diagrams showing examples of communication systems according to embodiments of the present invention.
Figure 1B:
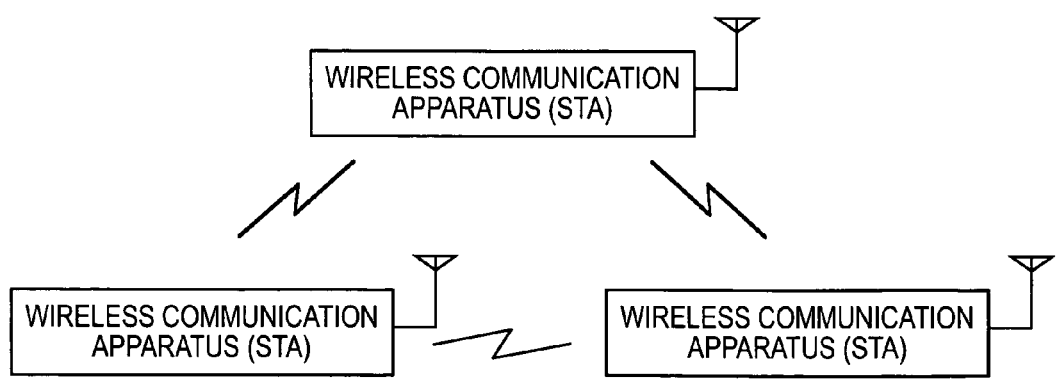

FIGS. 1A and 1B show examples of wireless communication systems using wireless communication apparatus 100 according to a first embodiment. In the example shown in FIG. 1A, an infrastructure network is used. On the other hand, in the example shown in FIG. 1B, an ad hoc network is used.

In the wireless communication system according to the present embodiment, various wireless communication techniques, which allow short range communication using a wireless LAN, may be used. Specific examples are a UWB (Ultra Wide Band) communication technique, an OFDM (Orthogonal Frequency Division Multiplexing) communication technique, and a CDMA (Code Division Multiple Access) communication technique.

As shown in FIG. 1A, the infrastructure network system includes a wireless communication apparatus serving as an access point AP, and mobile stations (wireless communication apparatus STA1, STA2, etc.) located within an area in which a radio wave can reach mobile stations. A communication service area in which a radio wave transmitted from the access point AP can be receivable is referred to as a BSS (Basic Service Set), which corresponds to a cell in a cellular system. The access point is connected to an external backbone network such as Ethernet (registered trademark). The access point AP transmits a control signal called a beacon in proper time intervals. If the wireless communication apparatus STA1 or STA2 detects the beacon, the wireless communication apparatus STA1 or STA2 recognizes that there is an access point at a close location, and the wireless communication apparatus STA1 or STA2 establishes a connection with the access point AP via a predetermined process.

The beacon transmitted by the access point AP includes a parameter called a target beacon transmit time (TBTT) to notify the wireless communication apparatus STA1 and STA2 of a time at which a next beacon will be transmitted. When the TBTT is reached, the access point AP performs a beacon transmission process to transmit a beacon. By receiving this beacon, the wireless communication apparatus STA1 and STA2 can know when a next beacon will be transmitted. This allows the wireless communication apparatus STA1 and STA2 to turn off the power of their transmitting/receiving unit and be in a sleep mode until an immediately next TBTT comes or until a TBTT comes after particular number of TBTTs are skipped.

On the other hand, in the ad hoc wireless LAN system such as that shown in FIG. 1B, no access point is needed, and mobile stations (wireless communication apparatus) STA1, STA2, and STA3 communicate directly with each other. In the ad hoc communication system, after a negotiation is performed among the wireless communication apparatus STA1, STA2, and STA3, an IBSS (Independent Basic Service Set) is autonomously defined. Thereafter, at predetermined time intervals, the TBTT is determined after a negotiation is performed among the wireless communication apparatus STA1, STA2, and STA3. Also in the IBSS, the wireless communication apparatus STA1, STA2, or STA3 may turn off the power for the transmitting/receiving unit and go into a sleep state as required. In the ad hoc communication system, the wireless communication apparatus STA1, STA2, and STA3 transmit a beacon in such a manner as will be described later in second and third embodiments.

In the present embodiment, it is assumed that in an infrastructure or ad hoc wireless communication network, media access control is performed according to a CSMA/CA (Carrier Sense Multiple Access with Collision Avoidance) scheme such that the timing of transmitting data over network media (space) is properly controlled. The CSMA/CA scheme allows it to access a DCF (Distributed Coordination Function) wireless communication channel while minimizing the probability that a collision occurs among frames (data).

Figure 2A:
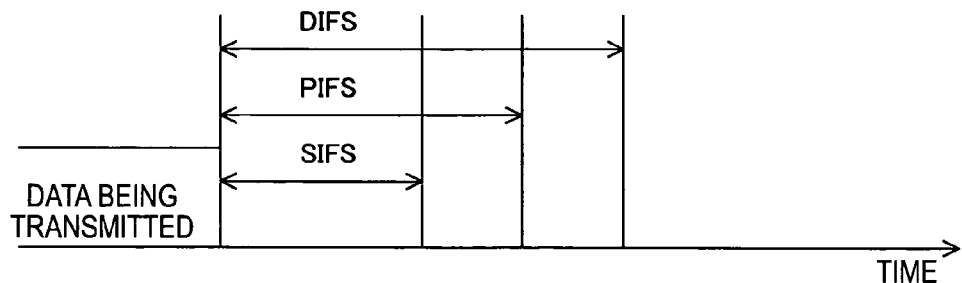
FIGS. 2A and 2B are diagrams showing communication processes using a DCF (Distributed Coordination Function)
Figure 2B:
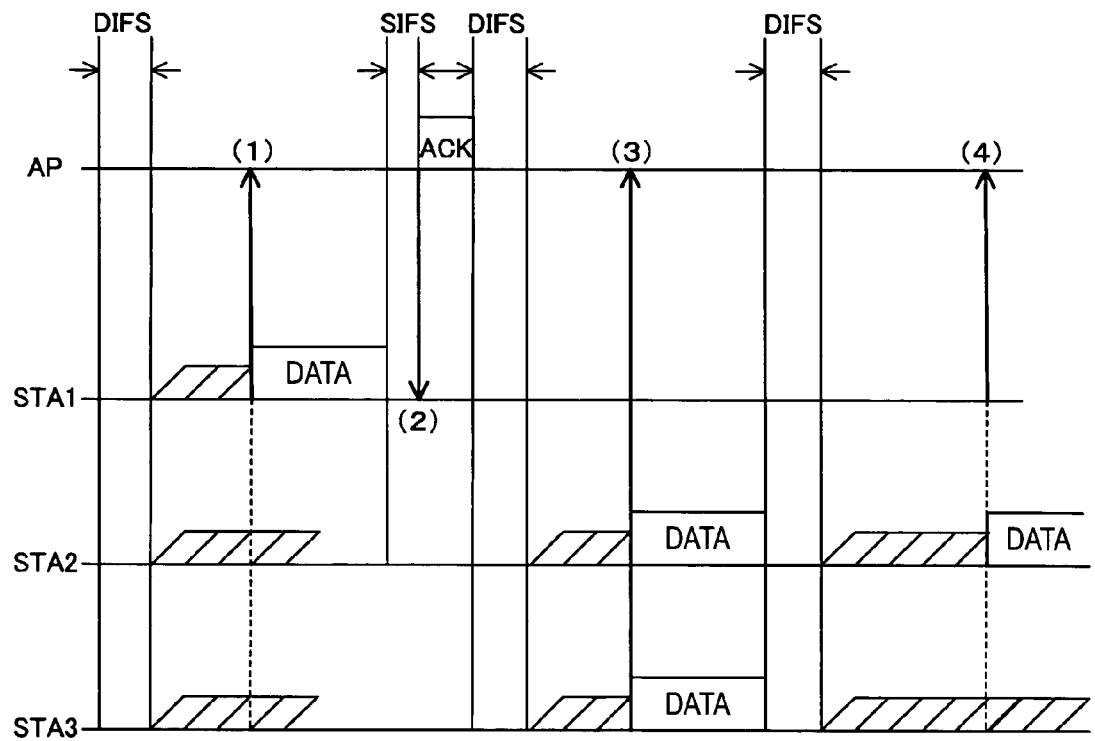

FIGS. 2A and 2B show a communication process by the DCF. In DCF communication, a wireless communication apparatus that is going to start communication performs a carrier sense for a particular period to check whether another wireless communication apparatus at a nearby location is transmitting a radio wave, that is, whether the radio communication channel is being used by another wireless communication apparatus. If the check indicates that the radio communication channel is not being used, the wireless communication apparatus starts communication. As shown in FIG. 2A, the carrier sensing is performed during a period called an inter frame space (IFS). The inter frame space has three types with a different length: an SIFS (Short IFS); a PIFS (Point Coordination Function IFS); and a DIFS (DFCIFS). The length of the IFS is determined depending on the priority of data to be transmitted.

In the DCF scheme, when normal data is transmitted, the DIFS, whose length is the greatest of all types of IFSs, is used. On the other hand, when an ACK (ACKnowledgement) signal is transmitted to notify a sending apparatus that data has been successfully received, the SIFS, whose length is the least of all types of IFSs, is used. Thus, it is possible to determine the priority of data according to the length of the frame space.

The PIFS is an optional frame space defined in the IEEE802.11 standard, for use to accomplish a point coordinate function in a period in which data is transmitted under centralized control. In the data transmission under the centralized control, a right to transmit data is given only to a wireless communication apparatus polled by the access point, and thus basically no data collision occurs. Because the length of a PIFC is shorter than that of a DIFS used in the DCF, it is possible insert a PIFC in a DIFS.

FIG. 2A shows a process of transmitting data according to the CSMA/CA scheme in the infrastructure mode. In the example shown in FIG. 2A, a back-off time is used to further reduce the probability that a data collision occurs. More specifically, the control of data transmission using the back-off time is performed such that when a plurality of wireless communication apparatus have data to transmit, the respective wireless communication apparatus first perform a carrier sensing operation in a DIFS and further in a following random time (that is, a back-off time) that is set for each wireless communication apparatus, and a right to transmit the data is given to a wireless communication apparatus whose back-off time has become zero earliest of all wireless communication apparatus thereby avoiding a data collision.

The back-off time is given as follows:

$$\text{back-off time} = \text{random}() \times \text{slot time}$$

where the slot time is a predetermined unit time, and random( ) is a random integer within a predetermined range (contention window).

The contention window (CW) can take an integral value within the range from a minimum value CWmin to a maximum value CWmax, that is, $$CWmin \leq CW \leq CWmax$$

Each time data is retransmitted because of a frame collision or the like, the contention window is increased exponentially according to the following equation:

$$CW = (CWmin+1) \times 2n - 1$$

where n is an integer equal to or greater than 0 indicating the number of times data has been retransmitted. That is, each time data is retransmitted, the condition window is doubled.

In the example shown in FIG. 2B, a 2-slot time is assigned as the back-off time to the wireless communication apparatus STA1, and a 4-slot time is assigned to the wireless communication apparatus STA2 and STA3.

In the example shown in FIG. 2B, the three wireless communication apparatus STA1, STA2 and STA3 perform the carrier sensing operation during DIFSs plus the back-off time assigned to the respective wireless communication apparatus. In this specific example shown in FIG. 2B, because the back-off time assigned to the wireless communication apparatus STA1 is the shortest, the back-off time becomes zero first at a point of time denoted by an arrow (1), and thus the wireless communication apparatus STA1 acquires a right to transmit data first among the three wireless communication apparatus. During a time in which the wireless communication apparatus STA1 transmits the data to the access point AP, the radio communication channel is in a busy state, and thus the wireless communication apparatus STA2 and STA3 do not decrement the back-off time assigned thereto. As a result, the back-off times equal to 2 slots assigned to the respective wireless communication apparatus STA2 and STA3 are retained until a next transmission timing.

If the access point AP receives data transmitted from the wireless communication apparatus STA1, the access point AP transmits an ACK signal to the wireless communication apparatus STA1 at a time denoted by an arrow (2) to notify that the data has been successfully received. Because a SIFS frame space is applied to the transmission of the ACK signal, the wireless communication apparatus STA2 and STA3 are not allowed to transmit data to the access point AP until the transmission of the ACK signal is completed.

After the transmission of the ACK signal from the access point AP to the wireless communication apparatus STA1 is completed, the wireless communication apparatus STA2 and STA3 perform the carrier sensing operation during the DIFS period plus the retained back-off time (equal to 2 slots. As a result, both wireless communication apparatus STA2 and STA3 determine that the radio communication channel is idle, and both wireless communication apparatus STA2 and STA3 transmit data to the access point AP simultaneously at a point of time denoted by an arrow (3).

As a result, a data collision occurs, and the wireless communication apparatus STA2 and STA3 cannot receive an ACK signal from the access point AP. Thus, both wireless communication apparatus STA2 and STA3 perform a retransmission operation. In the retransmission operation, the wireless communication apparatus STA2 and STA3 again set the back-off time for the retransmission of data. As described above, the contention window is doubled each time retransmission of data is performed as described above. Therefore, the probability that both wireless communication apparatus STA2 and STA3 generate the same random number decreases with the number of times retransmission is performed. In the specific example shown in FIG. 2B, a 4-slot time is re-assigned as the back-off time to the wireless communication apparatus STA2, while a 7-slot time is re-assigned as the back-off time to the wireless communication apparatus STA3. In this case, the wireless communication apparatus STA2 acquires a right to transmit data earlier than the wireless communication apparatus STA3, and the wireless communication apparatus STA2 transmits data to the access point AP at a time denoted by an arrow (4). On the other hand, the wireless communication apparatus STA3 holds the remaining back-off time equal to 3 slots until a next transmission timing. Note that as described above, the contention window, which is doubled each time retransmission of data is performed, is initialized at a properly set time.

Figure 10:
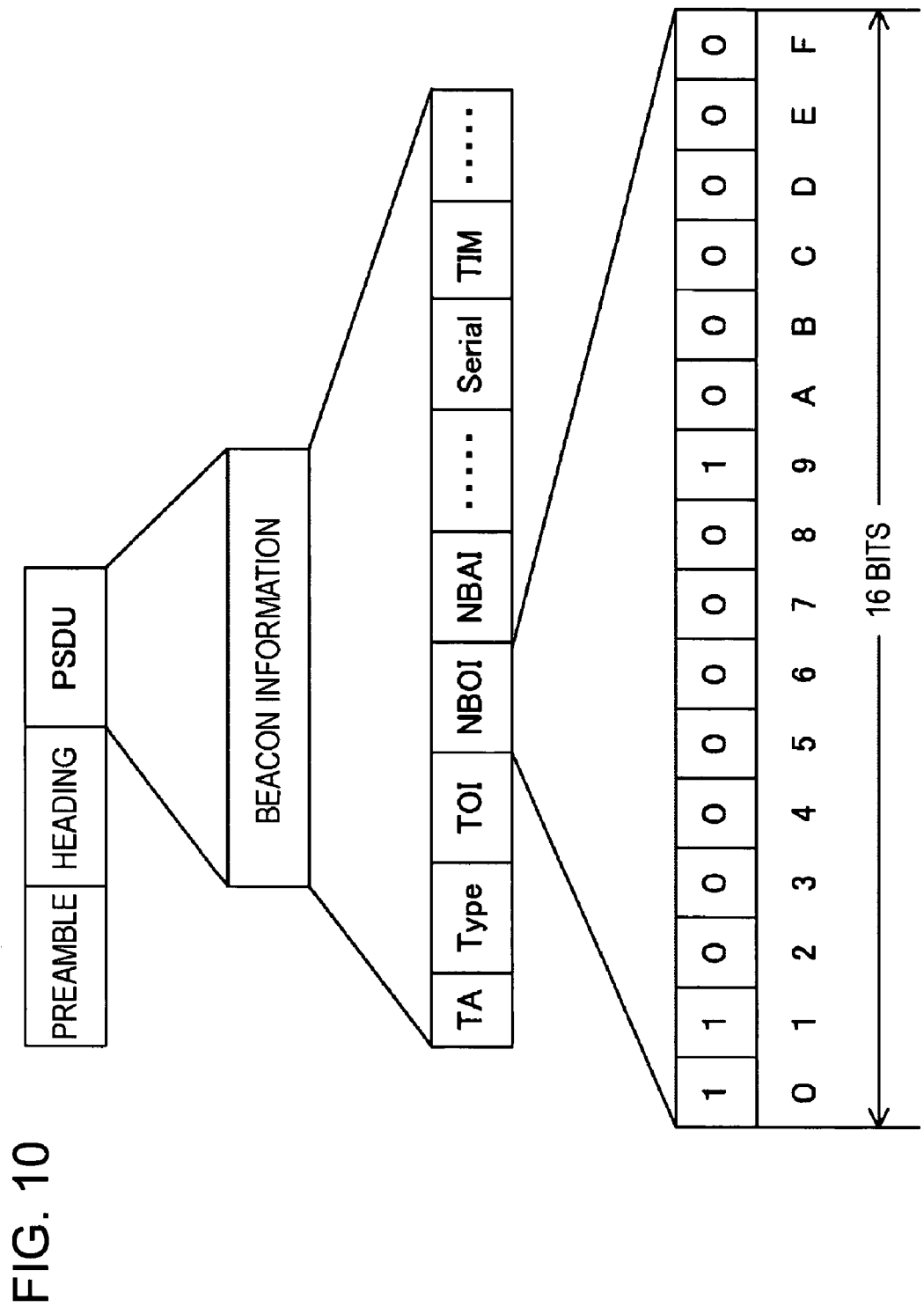
FIG. 10 is a diagram showing an example of a format of a beacon according to an embodiment of the present invention.

Note that data is transmitted in the form of packets. As shown in FIG. 10, each packet has a preamble at the head thereof. By detecting a preamble, a determination is made as to the usage status of the radio communication channel.

Figure 3:
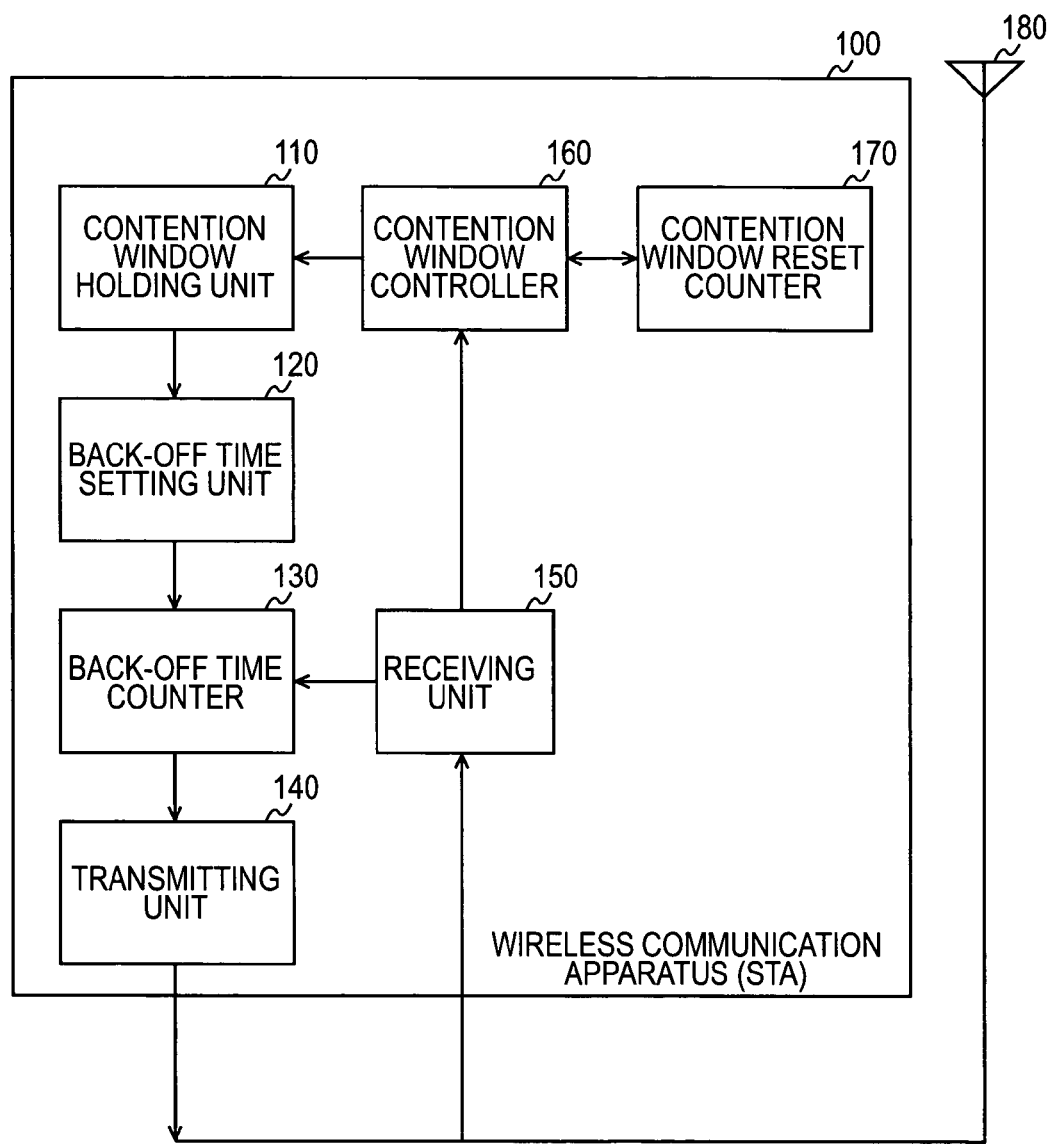
FIG. 3 is a functional block diagram of a wireless communication apparatus according to an embodiment of the present invention.

With reference to FIG. 3, an example of a functional configuration of a wireless communication apparatus 100 according to the present embodiment is described below. The wireless communication apparatus 100 includes a contention window holding unit 110, a back-off time setting unit 120, a back-off time counter 130, a transmitting unit 140, a receiving unit 150, a contention window controller 160, a contention window reset counter 170, and an antenna 180.

The contention window holding unit 110 holds a contention window. The back-off time setting unit 120 generates a random number within the contention window held by contention window holding unit 110, and sets the back-off time based on the generated random number.

The back-off time counter 130 counts down the back-off time. The back-off time counter 130 decrements the back-off time or stops the counting operation depending on the usage status of the radio communication channel detected as a result of the carrier sensing process. More specifically, when the radio communication channel is idle, the random number is reduced in units of slot times. On the other hand, when the radio communication channel is busy, decrementing of the back-off time is not performed until the radio communication channel becomes idle.

When the back-off time counted by the back-off time counter 130 becomes zero, the transmitting unit 140 modulates data stored in a data buffer (not shown) and transmits the resultant data over the radio communication channel via the antenna 180.

The receiving unit 150 performs a carrier sense on the radio communication channel to determine whether the radio communication channel is busy or idle and receives data transmitted from another wireless communication apparatus 100 via the antenna 180. When the receiving unit 150 detects that data transmitted by the transmitting unit 140 collides with data transmitted by another wireless communication apparatus, the receiving unit 150 notifies the contention window controller 160 of the occurrence of the data collision.

The contention window reset counter 170 counts a predetermined time to determine the timing of initializing the contention window at predetermined time intervals. If elapse of the predetermined time is detected, the contention window reset counter 170 notifies the contention window controller 160 that the predetermined time has elapsed. The contention window reset counter 170 may be configured in the form of a count-up timer or a count-down timer.

The contention window controller 160 controls the contention window value held by the contention window holding unit 110. More specifically, if the contention window controller 160 is notified by the receiving unit 150 of an occurrence of a data collision, the contention window controller 160 doubles the contention window held by the contention window holding unit 110. This results in an expansion of the range within which the random number is generated by the back-off time setting unit 120 and thus a reduction in the probability that the wireless communication apparatus 100 is assigned a back-off time equal to that assigned to another wireless communication apparatus. As a result, it is possible to reduce the probability that a data collision occurs.

If the contention window controller 160 is informed by the contention window reset counter 170 that the particular time has elapsed, the contention window controller 160 initializes the contention window value held by the contention window holding unit 110. That is, the contention window is periodically initialized at particular time intervals counted by the contention window reset counter 170, regardless of whether the ACK signal is received or not.

The operation of the wireless communication apparatus 100 according to the present embodiment is explained below.

Figure 4:
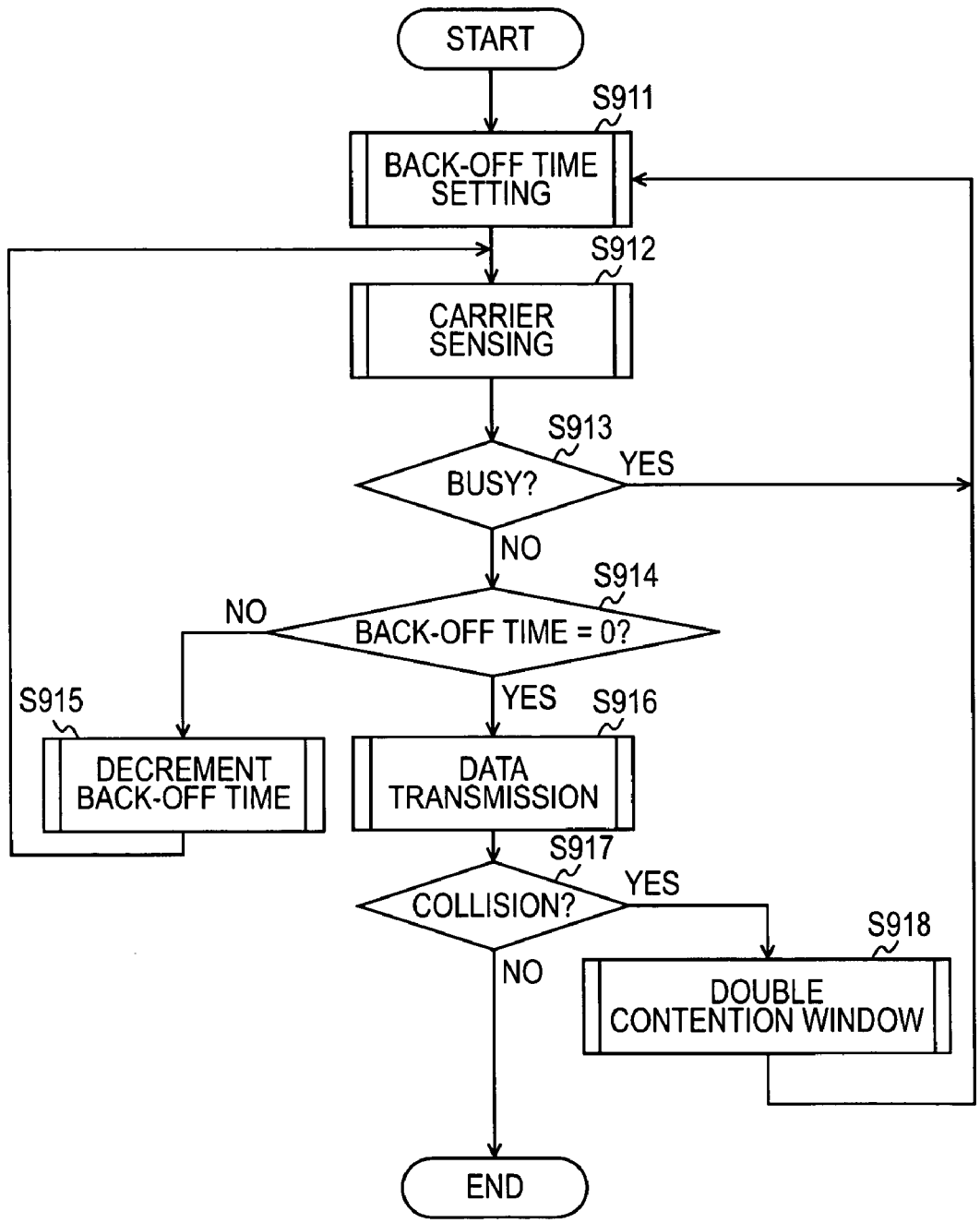
FIG. 4 is a flow chart showing a data transmission process performed by a wireless communication apparatus according to an embodiment of the present invention.

First, with reference to FIG. 4, the data transmission operation of the wireless communication apparatus 100 according to the present embodiment is described. When data to be transmitted occurs, the back-off time setting unit 120 generates a random number based on the contention widow held by the contention widow holding unit 110, and sets the back-off time based on the random number (step S911).

The receiving unit 150 performs a carrier sensing operation (step S912). If the result of the carrier sensing process in step S912 indicates that a radio communication channel is busy (that is, if the answer to step S913 is YES), the back-off time setting unit 120 again sets the back-off time (step S911). On the other hand, if the radio communication channel is idle (that is, if the answer to step S913 is NO), the back-off time is decremented by one slot time at a time (step S915) until the back-off time counted by the back-off time counter 130 becomes zero (that is, until the answer to step S914 becomes YES).

If the back-off time becomes zero (that is, if the answer to step S914 is YES), data which should be transmitted is transmitted in the form of a packet by the transmitting unit 140 (step S916). When the data is transmitted, the receiving unit 150 determines whether the transmitted data collides with another data on the radio communication channel. If a collision between data on the radio communication channel is detected (if the answer to step S917 is YES), the contention window controller 160 doubles the contention window held by the contention window holding unit 110 (step S918). Thereafter, based on the doubled contention window, the back-off time setting unit 120 again sets the back-off time (step S911). The above-described process is performed repeatedly until the data is successfully transmitted (that is, until the answer to step S917 becomes NO).

Figure 5:
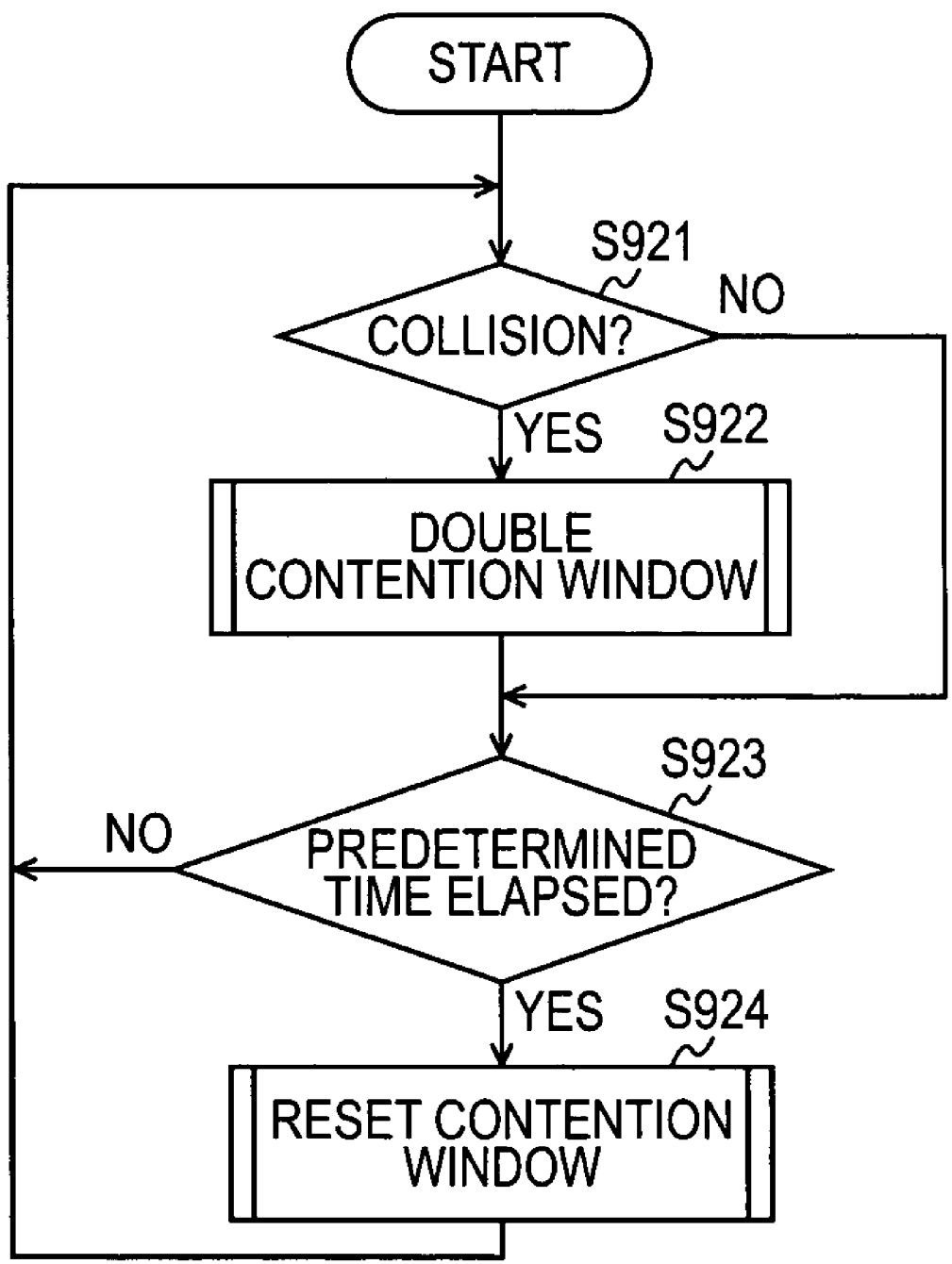
FIG. 5 is a flow chart showing a contention window initialization process performed by a contention window controller according to an embodiment of the present invention.

Next, with reference to FIG. 5, a process of initializing the contention window according to the present embodiment is described below. Note that the initialization of the contention window is performed un the control of the contention window controller 160.

First, the receiving unit 150 determines, based on received signals, whether there is a collision among data (step S921). If a collision among data is detected (that is, if the answer to step S921 is YES), the contention window controller 160 doubles the contention window held by the contention window holding unit 110 (step S922). Then a judgment is made as to whether the contention window reset counter 170 has counted the particular time (step S923).

On the other hand, when no data collision is detected (that is, when the answer to step S921 is NO), the contention window controller 160 determines whether the contention window reset counter 170 has counted the particular time (step S923). If the particular time has been counted by the contention window reset counter 170 (that is, if the answer to step S923 is YES), the contention window controller 160 determines that the specified time has elapsed, and resets the contention window held by the contention window holding unit 110 to the initial value (step S924). As described above, when a data collision occurs, the contention window controller 160 doubles the contention window value held by the contention window holding unit 110 and initializes the contention window value whenever the particular time has elapsed.

Figure 6:
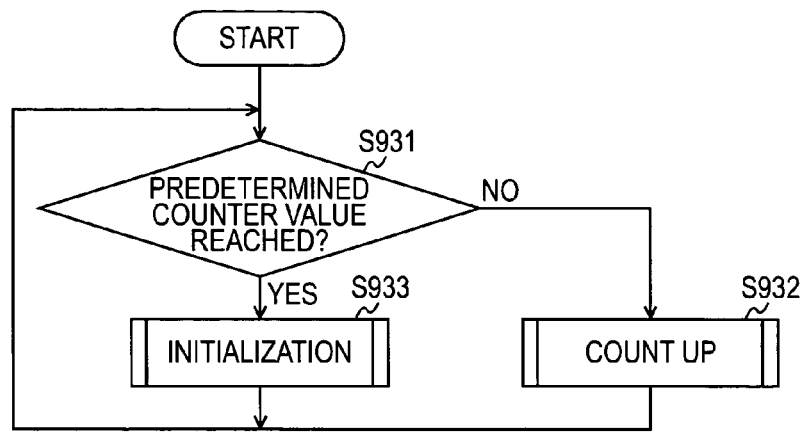
FIG. 6 is a flow chart showing a process of initializing a contention window reset counter according to an embodiment of the present invention.

Now, with reference to FIG. 6, the operation of the contention window reset counter 170 is explained. FIG. 6 shows a flow chart of the operation of the contention window reset counter 170 configured in the form of an count-up timer according to the present embodiment. A particular time to be counted is set in the contention window reset counter 170. Until the particular time is reached (that is, until the answer to step S931 becomes YES), the contention window reset counter 170 counts up (step S932). If the counted value reaches the specific set value (that is, if the answer to step S931 is YES), the contention window reset counter 170 is initialized (step S933). Thereafter, the contention window reset counter 170 performs the above-described process repeatedly.

The particular time counted up by the contention window reset counter 170 may be set depending on the number of wireless communication apparatus 100 existing on the wireless communication network so that the data transmission interval is set to a proper value depending on the number of wireless communication apparatus 100 existing on the wireless communication network so as to increase the overall throughput of the wireless communication network. The information indicating the number of wireless communication apparatus 100 connected to the wireless communication network may be included in a beacon transmitted from the access point AP so that each wireless communication apparatus 100 can know, by analyzing the beacon, the number of the number of wireless communication apparatus 100 connected to the wireless communication network.

Figure 7:
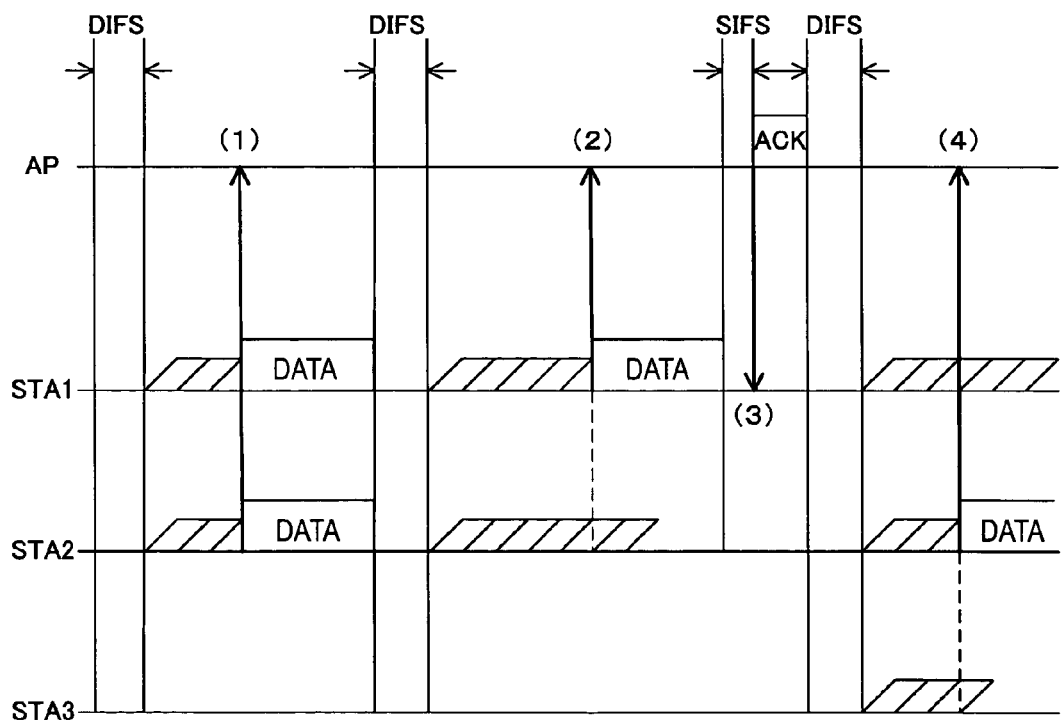
FIG. 7 is a diagram showing a flow of data over a radio communication network according to an embodiment of the present invention.

Now, with reference to FIG. 7, a data flow in the wireless communication network according to the present embodiment is explained. Herein, it is assumed that the contention window values currently held by the respective wireless communication apparatus STA1, STA2 and STA3 are equal to an initial value CWmin, and it is also assumed that the back-off time set based on the contention window with the initial value CWmin for the wireless communication apparatus STA1 and that for the wireless communication apparatus STA2 are equal to a 2-slot time.

If data which should be transmitted occurs in the wireless communication apparatus STA1 and also in the wireless communication apparatus STA2, the process is performed as follows. In this specific case, because the back-off time currently set is equal for both wireless communication apparatus STA1 and STA2, both wireless communication apparatus STA1 and STA2 determine, at a time denoted by an arrow (1), that they get right to transmit data and thus they transmit data to the access point AP. As a result, a data collision occurs at the time denoted by the arrow (1). To retransmit the data, the wireless communication apparatus STA1 and the wireless communication apparatus STA2 double the contention window currently set to the initial value CWmin and reset the back-off time.

If it is assumed that the back-off time for the wireless communication apparatus STA1 is reset to a 4-slot time, and the back-off time for the wireless communication apparatus STA2 is reset to a 6-slot time, then the wireless communication apparatus STA1 gets a transmission right earlier than the wireless communication apparatus STA2, when the back-off time has been reduced by a value equal to the 4-slot time, that is, at a time denoted by an arrow (2), and thus the wireless communication apparatus STA1 transmits data to the access point AP.

In this case, the data is successfully transmitted to the access point AP. If the access point AP receives the data, the access point AP transmits an ACK signal to the wireless communication apparatus STA1 at a time denoted by an arrow (3) after carrier sensing is performed in SIFS.

After the wireless communication apparatus STA1 succeeds in transmitting the data, if data which should be transmitted occurs in the wireless communication apparatus STA1, STA2 and STA3, back-off times for the respective wireless communication apparatus STA1, STA2 and STA3 are set as follows. For the wireless communication apparatus STA1, the back-off time is set based on the doubled contention window (=2×CWmin), for example, to a 5-slot time. On the other hand, the back-off time for the wireless communication apparatus STA2 is retained at the 2-slot time. For the wireless communication apparatus STA3, the back-off time is set based on the contention window with the initial value (CWmin), for example, to a 3-slot time.

In this case, the wireless communication apparatus STA2 first gets data transmission right and transmits data, and then the wireless communication apparatus STA3 gets data transmission right. Finally, the wireless communication apparatus STA1 gets data transmission right.

In the wireless communication apparatus 100 (STA) according to the first embodiment, as described above, unlike the conventional technique in which the contention window value is initialized in response to receiving an ACK signal after a success in retransmission of data, the contention window is initialized periodically at particular time intervals counted by the contention window reset counter 170, regardless whether the contention window held by the contention window holding unit 110 has a large value as a result of doubling performed each time data is retransmitted. That is, the data transmission interval is properly controlled depending on the traffic so that data is transmitted in an efficient manner that results in an improvement in the overall throughput of the system.

More specifically, when the system has low total traffic, the probability of data collision is low, and thus the back-off time for each wireless communication apparatus 100 is set depending on the contention window having a value close to the initial value. On the other hand, when the system has high total traffic, frequent data retransmission can occur, and the contention window is doubled each time data retransmission is performed, and the back-off time for each wireless communication apparatus 100 is set based on the resultant expanded contention window. This causes a reduction in the probability that the same back-off time is set for a plurality of wireless communication apparatus 100 and thus causes a reduction in the probability of data collision.

The expanded contention window is retained even after a success of data retransmission, until the particular time has been counted by the contention window reset counter 170. This causes a reduction in the probability that a data collision occurs again in a high traffic condition.

That is, the contention window for the wireless communication apparatus 100 is not initialized even if an ACK is received after a success in data retransmission, until the particular time has been counted by the contention window reset counter 170. Thus, unlike the conventional technique in which the back-off time is set based on the initial contention window value only for a wireless communication apparatus that has succeeded in data retransmission, the possibility is low that the radio communication channel is occupied for a long time only by the wireless communication apparatus that succeeded in data retransmission. This ensures that equal opportunity of using the network is given to all wireless communication apparatus.

When the wireless communication network is configured in the form of a wireless LAN system using UWB, a transmitted data signal has frequency components spread over a very wide band such as about 1 GHz, and each frequency component has a very small amplitude similar to that of noise, and thus it takes a long time to detect a preamble. Therefore, in some cases, a preamble is detected after a back-off time has elapsed. In this case, there is a high probability that a data collision occurs. In the wireless communication apparatus 100 according to the present embodiment, as described above, the data transmission intervals are properly controlled so that a data collision is prevented and data is transmitted in an efficient manner that results in an increase in the overall throughput of the system. This ensures that equal opportunity of using the network is given to all wireless communication apparatus.

Second Embodiment

Now, a second embodiment of the invention is described. In this second embodiment, it is assumed that an ad hoc wireless communication network including wireless communication apparatus 200 (STA), such as that shown in FIG. 1B, is used.

First, with reference to FIG. 8, an example of a functional configuration of a wireless communication apparatus (STA) 200 according to the second embodiment is described. The wireless communication apparatus 200 according to the second embodiment includes a contention window holding unit 210, a back-off time setting unit 220, a back-off time counter 230, a transmitting unit 240, a receiving unit 250, a contention window controller 260, a beacon generating/processing unit 280, and an antenna 290. The contention window holding unit 210, the back-off time setting unit 220, the back-off time counter 230, the transmitting unit 240, the receiving unit 250, and the antenna 290 are substantially similar in function to the contention window holding unit 110, the back-off time setting unit 120, the back-off time counter 130, the transmitting unit 140, the receiving unit 150, and the antenna 180 according to the first embodiment described above. Thus, the following discussion will be focuses on the beacon generating/processing unit 280 and the contention window controller 260.

The beacon generating/processing unit 280 generates a beacon signal in a predetermined format, which is exchanged periodically among wireless communication apparatus 200 at nearby locations. The beacon generating/processing unit 280 also has a function of analyzing a beacon signal received from another wireless communication apparatus 200 to detect the presence of the wireless communication apparatus 200 at a nearby location and acquire information indicating the timing of receiving a beacon from the nearby wireless communication apparatus 200. The beacon signal generated by the beacon generating/processing unit 280 is periodically transmitted from the transmitting unit 240.

As in the first embodiment described above, the contention window controller 260 controls the contention window value held by the contention window holding unit 210. In this second embodiment, the contention window controller 260 initializes the contention window held by the contention window holding unit 210 each time a beacon signal is transmitted. Also in the second embodiment, the wireless communication apparatus 200 may include a contention window reset counter 270 similar to the contention window reset counter 170 according to the first embodiment described above, so that the contention window is initialized when a particular time is counted by the contention window reset counter 270. That is, when the beacon transmission interval is too long, the contention window is initialized by the contention window reset counter 270 in the middle of the beacon transmission interval. As a result, the contention window is controlled to a proper value.

In the above process, the number of wireless communication apparatus 200 existing on the wireless communication network may be detected by analyzing beacons transmitted from other wireless communication apparatus 200, and the counter value counted by the contention window reset counter 270 may be set depending on the detected number of wireless communication apparatus 200 existing on the wireless communication network. Note that the number of wireless communication apparatus 200 existing on the wireless communication network may be determined from information described in an NBOI field of a beacon as will be described later.

Next, with reference to FIG. 9, a beacon transmission process performed by the wireless communication apparatus 200 is explained. Each wireless communication apparatus 200 on the wireless communication network transmits a beacon at predetermined intervals to notify other wireless communication apparatus of the presence of the wireless communication apparatus 200. In the following discussion, it is assumed that the beacon transmission interval is set to 80 msec by way of example but not limitation. Hereinafter, the beacon transmission interval will be referred to as a super frame.

The wireless communication apparatus 200 on the wireless communication network checks information associated with other wireless communication apparatus included in a beacon transmitted by the other wireless communication apparatus and determines the timing of transmitting a beacon from the wireless communication apparatus 200. More specifically, the wireless communication apparatus 200 starts transmitting a beacon at the exact or nearly exact center of a longest beacon interval of those of receivable beacons so that the beacon does not collide, in a super frame, with beacons transmitted from other existing wireless communication apparatus.

For example, when only one wireless communication apparatus 200, for example, the wireless communication apparatus STA1 is connected to the wireless communication network, the wireless communication apparatus STA1 can start transmission of a beacon B01 at an arbitrary time as shown in FIG. 9A.

If a wireless communication apparatus STA2 participates in the wireless network, the wireless communication apparatus STA2 detects the presence of the wireless communication apparatus STA1 from the beacon B01 transmitted from the wireless communication apparatus STA1 and the wireless communication apparatus STA2 transmits a beacon B02 at the center of the interval of the beacon B01 transmitted from the wireless communication apparatus STA1 as shown in FIG. 9B.

If a still another wireless communication apparatus STA3 participates in the wireless network and receives the beacons B01 and B02 transmitted from the wireless communication apparatus STA1 and STA2, the wireless communication apparatus STA3 transmits a beacon B03 at the center of the period from the transmission of the beacon B01 to the transmission of the beacon B02, as shown in FIG. 9C.

As described above, each wireless communication apparatus 200 on the wireless communication network controls the timing of transmitting a beacon so that the transmitted beacon does not collide with other beacons existing in a super frame. If each wireless communication apparatus 200 transmits a beacon at the exact or nearly exact center of a longest beacon transmission interval of beacon transmission intervals detected by each wireless communication apparatus 200, beacon transmission timings are dispersed over a super frame, and thus an increase in the transmission efficiency is achieved.

An example of a format of a beacon is described below with reference to FIG. 10. First, a packet format is explained. In the present embodiment, data is transmitted in the form of a packet. Each packet includes a preamble, a heading part, and a payload part (PSDU (PHY Service Data Unit)).

The preamble serves to indicate the presence of the packet and is described in a unique word. Each wireless communication apparatus 200 can determine whether the radio communication channel is busy or idle by detecting an preamble of a beacon transmitted from other wireless communication apparatus. In the heading part, the attribute of the packet, the length, the transmission power, and the physical layer protocol (PHY) (the payload transmission rate in the case of a multi transmission rate mode) are described. The payload part includes an MAC header and a MSDU (MAC Service Data Unit). In general, data is transmitted in the form of a packet with the format described above.

When a beacon is transmitted, the heading part includes information indicating that the packet is a beacon, and the payload part (PSDU) includes principal information (beacon information) carried on the beacon. In the specific example shown in FIG. 10, the beacon information includes a TA (Transmitter Address) field in which an address uniquely identifying a transmitting wireless communication apparatus is described, a TYPE field in which the type of the beacon is described, a TOI (TBTT Offset Indication) field in which a TBTT offset value in a super frame period in which the beacon was transmitted is described, an NBOI (Neighboring Beacon Offset Information) field in which a time at which bacons transmitted from neighboring wireless communication apparatus are receivable is described, an NBAI (Neighboring Beacon Activity Information) field in which information indicating the transmission time of a beacon being currently received by the present wireless communication apparatus is described, a SERIAL field in which a unique serial number assigned to the present beacon of a plurality of beacons transmitted in the present super frame period is described, and a TIM (Traffic Indication Map) field in which information indicating a destination of the beacon transmitted from the present wireless communication apparatus is described.

More specifically, in the NBOI field of the beacon information, time positions (receiving times) in a super frame at which the present wireless communication apparatus can receive a beacon transmitted from a neighboring wireless communication apparatus is described. For example, when it is allowed to place sixteen beacons in one super frame, positions at which beacons can be received are represented in the form of a bit map with a length of 16 bits in the NBOI field, as shown in FIG. 10. More specifically, a transmission time of a normal beacon transmitted of the present wireless communication apparatus is mapped as a reference at the first bit in the NBOI field, and beacon positions (receiving times) receivable by the present wireless communication apparatus are mapped at bits corresponding to relative positions with respect to the reference position (the transmission time of the normal beacon transmitted from the present wireless communication apparatus. That is, "1" is written at the reference position at which the normal beacon is transmitted from the present wireless communication apparatus and also at relative positions at which auxiliary beacons are receivable, and other bits corresponding to the other relative positions are maintained at 0.

In the specific example shown in FIG. 10, in a communication environment in which there are up to sixteen wireless communication apparatus 0 to F, 1100000001000000" is described in the NBOI field of PSDU of a beacon transmitted from a wireless communication apparatus 0 to inform that the wireless communication apparatus 0 can receive beacons from a wireless communication apparatus 1 and a wireless communication apparatus 9. That is, bits corresponding to relative positions at which beacons are receivable are marked "1", and bits corresponding to relative position at which no beacons are received are assigned a space. Thus, by examining the NBOI field, it is possible to detect the number of wireless communication apparatus currently existing on the wireless communication network. In the specific example shown in FIG. 10, there are three wireless communication apparatus including the wireless communication apparatus itself currently existing on the wireless communication network.

The operation of the wireless communication apparatus 200 according to the second embodiment is explained below.

Figure 11:
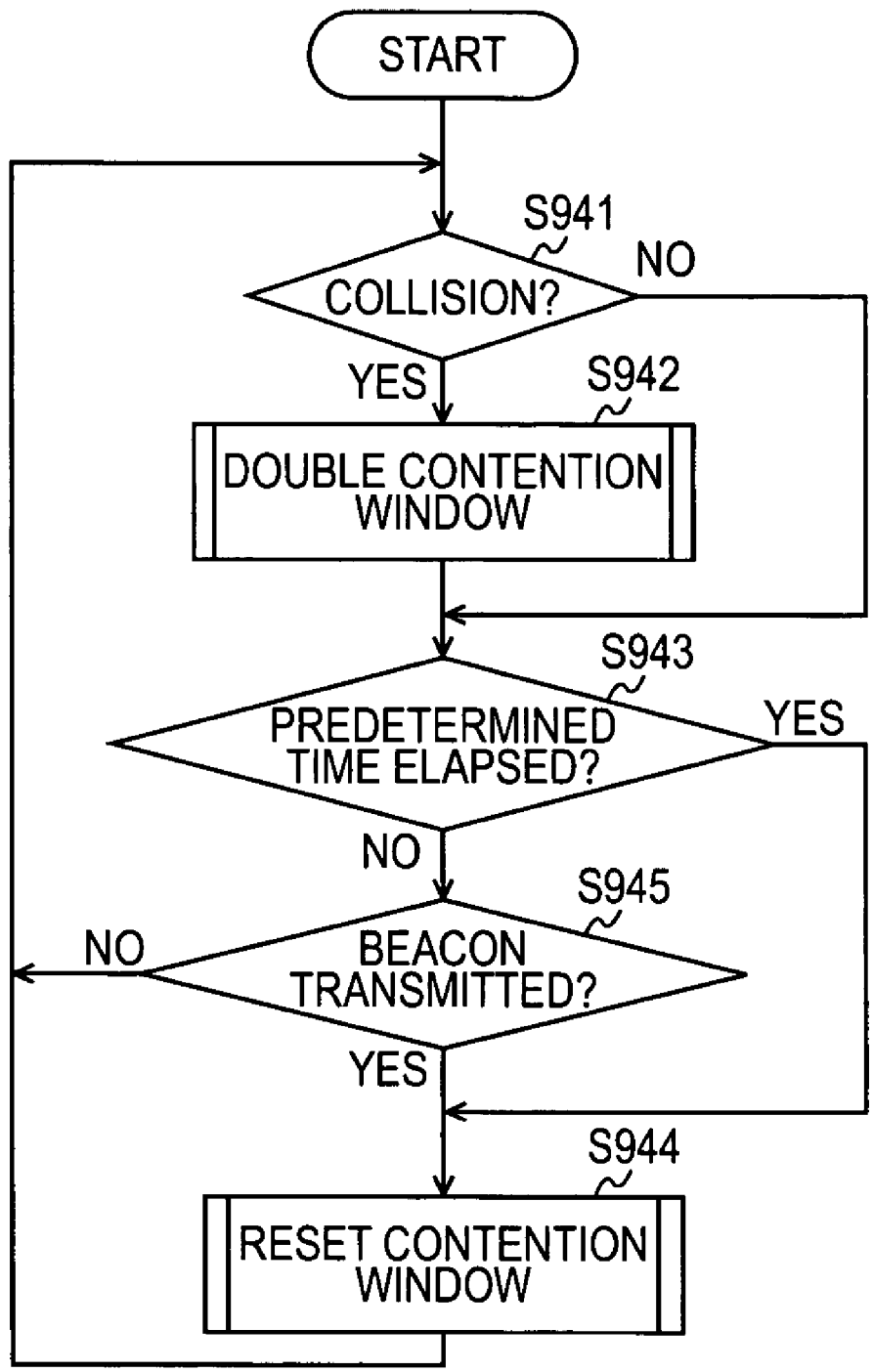
FIG. 11 is a flow chart showing a contention window initialization process performed by a contention window controller according to an embodiment of the present invention.

With reference to FIG. 11, a process of initializing the contention window according to the present embodiment is described below. The data transmission process performed by the wireless communication apparatus 200 according to the second embodiment is similar to that performed by the wireless communication apparatus 100 according to the first embodiment, and a duplicated explanation thereof is omitted herein. Note that the process associated with the initialization of the contention window is controlled by the contention window controller 260.

First, the receiving unit 250 determines, based on signals received via the communication channel, whether there is a collision among data (step S941). If a collision among data is detected by the receiving unit 250 (that is, if the answer to step S941 is YES), the contention window controller 260 doubles the contention window held by the contention window holding unit 210 (step S942). Then a judgment is made as to whether the contention window reset counter 270 has counted the particular time (step S943).

On the other hand, when no data collision is detected (that is, when the answer to step S941 is NO), the contention window controller 260 determines whether the contention window reset counter 270 has counted the particular time (step S943). If the particular time has been counted by the contention window reset counter 270 (that is, if the answer to step S943 is YES), the contention window controller 260 resets the contention window held by the contention window holding unit 210 to the initial value (step S944).

Even when the time counted by the contention window reset counter 270 has not yet reached the set time (the answer to step S943 is NO), the contention window controller 260 determines whether a beacon has been transmitted (step S945). If a beacon has been transmitted (that is, if the answer to step S945 is YES), the contention window controller 260 resets the contention window to the initial value (step S944).

The contention window controller 260 performs repeatedly the above-described process, that is, if a data collision occurs, the contention window controller 260 doubles the contention window value held by the contention window holding unit 210, and initializes the contention window value each time the predetermined time is counted by the contention window reset counter 270, while if a beacon is transmitted, the contention window controller 260 initializes the contention window.

Figure 12:
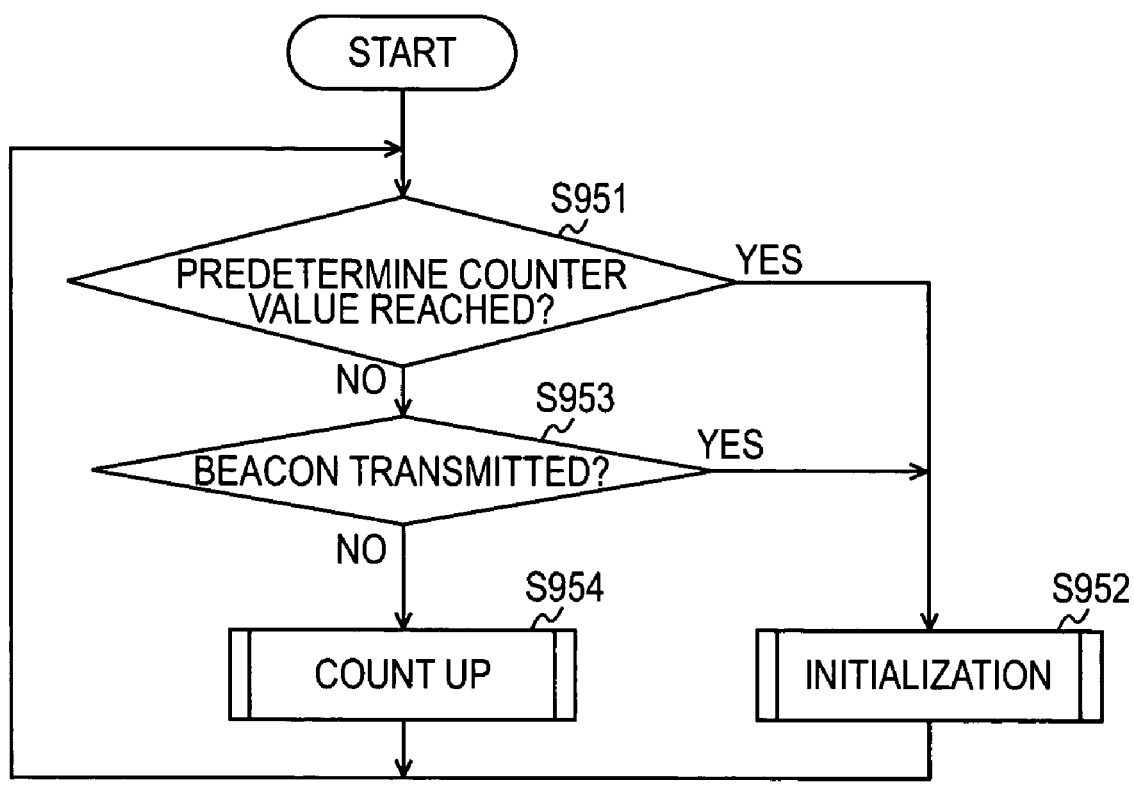
FIG. 12 is a flow chart showing a process of initializing a contention window reset counter according to an embodiment of the present invention.

Now, with reference to FIG. 12, the operation of the contention window reset counter 270 is explained. FIG. 12 shows a flow chart of the operation of the contention window reset counter 270 configured in the form of a count-up timer. A particular time to be counted is set in the contention window reset counter 270. When the predetermined time has been counted up by the contention window reset counter 270 (when the answer to step S951 is YES), the contention window reset counter 270 is initialized (step S952).

When the value counted by the contention window reset counter 270 has not yet reached the predetermined value (when the answer to step S951 is NO), if a beacon is transmitted by the transmitting unit 240 (the answer to step S953 is YES), the contention window reset counter 270 is initialized. That is, when the predetermined time has been counted up by the contention window reset counter 270 (when the answer to step S951 is YES) or when a beacon is transmitted (when the answer to step S953 is YES), the contention window reset counter 270 is initialized. (step S952).

In the wireless communication apparatus 200 according to the second embodiment, as described above, unlike the conventional technique in which the contention window value is initialized in response to receiving an ACK signal after a success in retransmission of data, when the time counted by the contention-window reset counter 270 has reached the predetermined value or when a beacon is transmitted, the contention window is initialized to the initial value. That is, the data transmission interval is properly controlled depending on the traffic so that data is transmitted in an efficient manner that results in an increase in the overall throughput of the system.

Third Embodiment

Figure 13:
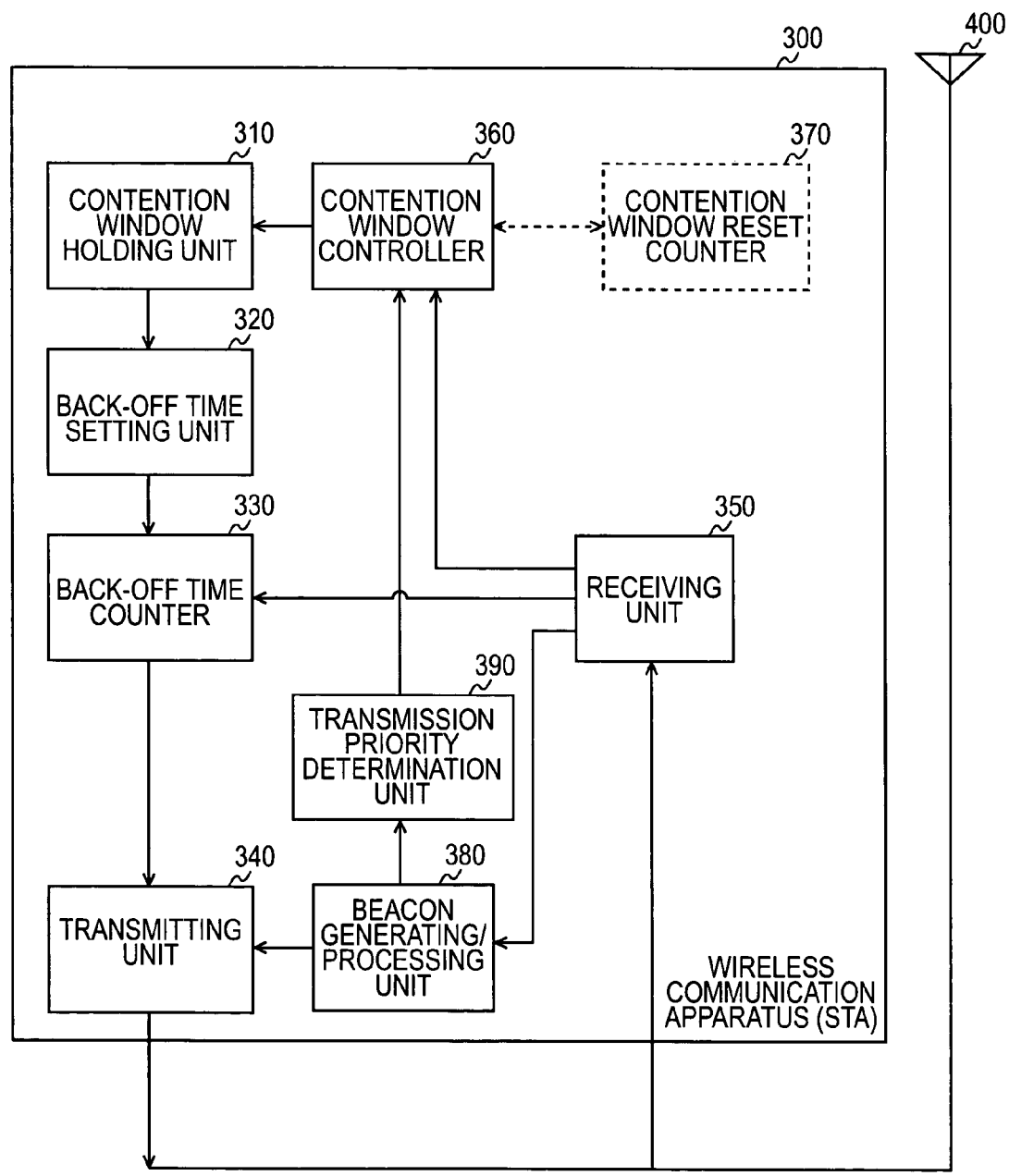
FIG. 13 is a functional block diagram of a wireless communication apparatus according to an embodiment of the present invention.

Now, a third embodiment of the invention is described. In a wireless communication apparatus 300 according to the third embodiment, as shown in FIG. 13, when a transmission prioritized period (TPP) is provided in a super frame such as that described above with reference to the second embodiment so that the wireless communication apparatus 300 has preferential right to transmit data during the TPP (see FIG. 14), the contention window is initialized immediately before the TPP. Also in this third embodiment, it is assumed that the wireless communication apparatus 300 is one of plurality of wireless communication apparatus that communicate with each other via a wireless communication network in the ad hoc mode in which each wireless communication apparatus transmits a beacon in a predetermined format according to the DCF scheme.

With reference to FIG. 13, an example of a functional configuration of a wireless communication apparatus (STA) 300 according to the third embodiment is described. The wireless communication apparatus 300 according to the third embodiment includes a contention window holding unit 310, a back-off time setting unit 320, a back-off time counter 330, a transmitting unit 340, a receiving unit 350, a contention window controller 360, a beacon generating/processing unit 380, a transmission priority determination unit 390, and an antenna 400. The contention window holding unit 310, the back-off time setting unit 320, the back-off time counter 330, the transmitting unit 340, the receiving unit 350, the beacon generating/processing unit 380, and the antenna 400 are substantially similar in function to the contention window holding unit 210, the back-off time setting unit 220, the back-off time counter 230, the transmitting unit 240, the receiving unit 250, the beacon generating/processing unit 280, and the antenna 290, respectively, according to the second embodiment described above. Thus, the following discussion will be focused on the transmission priority determination unit 390 and the contention window controller 360.

Based on a beacon generated by the beacon generating/processing unit 380, the transmission priority determination unit 390 determines the time position of a TPP in a super frame in which preferential right to transmit data is given to the wireless communication apparatus 300, and the transmission priority determination unit 390 notifies the contention window controller 360 of the detected position of the TPP. If the preferential right to transmit data is given to the wireless communication apparatus 300, the contention window controller 360 initializes the contention window held by the contention window holding unit 310.

Also in this third embodiment, the wireless communication apparatus 300 may include a contention window reset counter 370 similar to the contention window reset counter 170 according to the first embodiment described above, whereby the initialization of the contention window is performed when a predetermined time is counted by the contention window reset counter 370, in addition to the initialization of the contention window performed by the contention window controller 360 when preferential right to transmit data is given. That is, when intervals at which preferential right to transmit data is given to the wireless communication apparatus 300 are too long, the contention window is initialized by the contention window reset counter 370 in the middle of an interval whereby the contention window value held by the contention window holding unit 310 is properly controlled. In the above process, the number of wireless communication apparatus 300 existing on the wireless communication network may be detected from the NBOI field of beacons transmitted from other wireless communication apparatus 300, and the counter value counted by the contention window reset counter 370 may be set depending on the detected number of wireless communication apparatus 300 existing on the wireless communication network.

Now, with reference to FIG. 14, a media access control according to the present embodiment is explained.

Figure 14A:
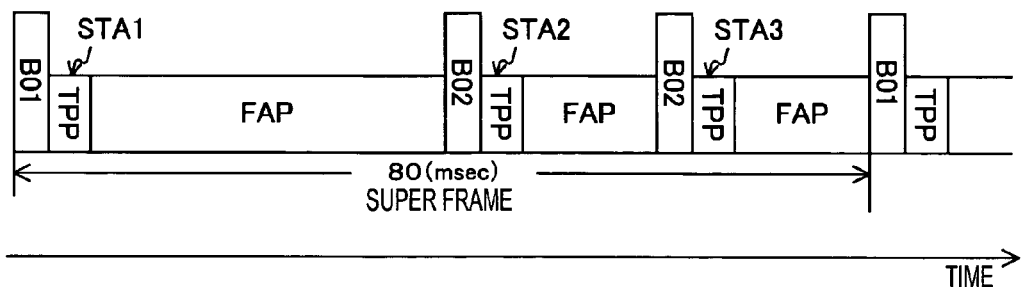
FIG. 14A is a diagram showing locations of transmission prioritized periods.

First, referring to FIG. 14A, the TPP (Transmission Prioritized Period) is explained. The TPP is a period in which a wireless communication apparatus 300 that acquired preferential transmission right is allowed to transmit data at frame intervals shorter that frame intervals at which the other wireless communication apparatus are allowed to transmit data. In the example shown in FIG. 14A, only in a particular period in a super frame, a TPP is given to a wireless communication apparatus STA1, STA2 or STA3 after a beacon B01, B02, or B03 is transmitted by wireless communication apparatus STA1, STA2 or STA3.

As shown in FIG. 14A, each TPP starts immediately after a beacon B01, B02 or B03 is transmitted and ends when a predetermined time has elapsed. Basically, a TPP is equally given to each of the wireless communication apparatus STA1, STA2 and STA3 so that each of the wireless communication apparatus STA1, STA2 and STA3 is allowed to transmit a beacon in each super frame. During a period from the end of a TPP given to a wireless communication apparatus to a time at which another wireless communication apparatus transmits a beacon, an equal transmission opportunity is given to all wireless communication apparatus STA1, STA2 and STA3. Thus, this period is referred to as a fairly access period (FAP). In each FAP, media access control is performed in a fair manner using the CSMA/CA technique or the like.

Although in the example shown in FIG. 14A, each TPP starts immediately after transmission of a beacon, the starting timing of each TPP may be given differently. For example, a TPP may be placed at a particular relative position with respect to a beacon transmission time. For example, a TPP may be placed at a position 480 μsec after a TBTT. In any case, in the wireless communication apparatus 300 according to the present embodiment, the transmission priority determination unit 390 determines the position of a TPP, in a super frame, assigned to the wireless communication apparatus 300, and the contention window controller 360 initializes the contention window value held by the contention window holding unit 310 before a TPP assigned to the wireless communication apparatus 300 occurs.

In the specific example shown in FIG. 14A, a beacon B01 is transmitted at the beginning of a super frame by the wireless communication apparatus STA1, a particular period immediately following the beacon B01 is assigned as a TPP to the wireless communication apparatus STA1. The following period until transmission of a beacon B02 from the wireless communication apparatus STA2 is an FAP. Similarly, immediately after a beacon B02 is transmitted, a TPP is assigned to the wireless communication apparatus STA2, and an FAP comes again in a period from the end of this TPP to a time at which a beacon B03 is transmitted. Immediately after the beacon B03 is transmitted, a TPP is assigned to the wireless communication apparatus STA3.

Figure 14B:
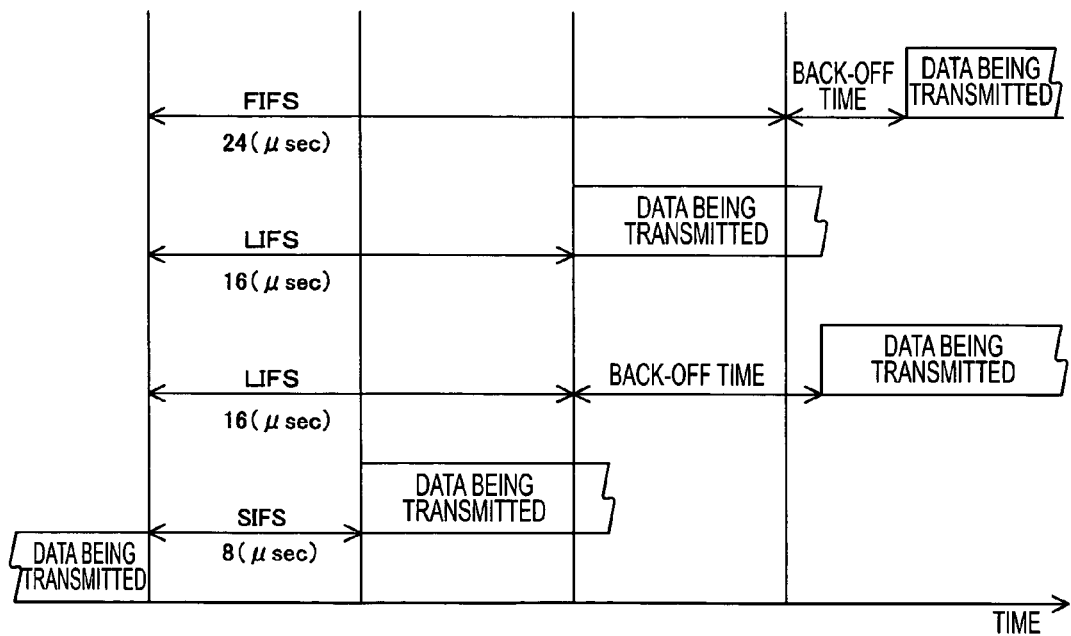
FIG. 14B is a diagram showing frame intervals at which data is transmitted by a wireless communication apparatus according to en embodiment of the present invention.

In the present embodiment, in each TPP and each FAP, media access control is performed as follows. First, as shown in FIG. 14B, a short interframe space (SIFS (Short IFS)) and a long interface space (LIFS (Long IFS)) are defined. Usually, a back-off time is added to each SIFS and also to each LIFS. In addition, a FIFS (Far IFS) further longer than the LIFS is defined. Specific values of interframe spaces are given, for example, as 8 μsec for the SIFS, 16 μsec for the LIFS, and 24 μsec for the FIFS. Note that the back-off time is set by the back-off time setting unit 320 of each wireless communication apparatus 300, based on the contention window held by the contention window holding unit 310.

In each FAP, each of wireless communication apparatus STA1, STA2 and STA3 transmits data at intervals equal to LIFS plus a back-off time assigned to each of wireless communication apparatus STA1, STA2 and STA3. Thus, media access control is performed based on the back-off time in a similar manner as described above with reference to FIGS. 2, 4 and 7. If data is successfully received by a receiving station, an ACK signal indicating the successful reception of the data is returned from the receiving station to a sending station at intervals corresponding to the SIFS.

On the other hand, in each TPP, as shown in FIG. 14A, preferential transmission right is given to a wireless communication apparatus 300 that transmitted a beacon immediately before the TPP. In each TPP, the other wireless communication apparatus have an opportunity to transmit data at frame intervals equal to the FIFS plus to the back-off time assigned to each wireless communication apparatus. Depending on the status of the wireless communication apparatus 300 to which the preferential transmission right is given, the other wireless communication apparatus are allowed to transmit data at frame intervals equal to the SIFS plus to the back-off time assigned to each wireless communication apparatus.

For example, when preferential transmission right is given in the TPP to the wireless communication apparatus STA1 that transmitted the beacon B01, the other wireless communication apparatus are allowed to transmit data at particular frame intervals as discussed below. The wireless communication apparatus STA1 that acquired the preferential transmission right is allowed to transmit data at frame intervals equal to the SIFS. The wireless communication apparatus STA1 can specify another wireless communication apparatus to which transmission right is also given in the same TPP as that given to the wireless communication apparatus STA1. For example, when the wireless communication apparatus STA2 is specified by the wireless communication apparatus STA1, the wireless communication apparatus STA2 is also allowed to transmit data at frame intervals equal to the SIFS in the TPP originally assigned to the wireless communication apparatus STA1.

In this situation, in a case in which, for example, the wireless communication apparatus STA3 has data to transmitted to the wireless communication apparatus STA1, if it is determined that the wireless communication apparatus STA1 having the transmission right and the wireless communication apparatus STA2 both have no data to transmit, the wireless communication apparatus STA3 is allowed to transmit the data at intervals equal to the SIFS plus the back-off time assigned to the wireless communication apparatus STA3. When the wireless communication apparatus STA1 having the transmission right and the wireless communication apparatus STA2 both have no data to transmit, the wireless communication apparatus STA3 attempts to access the wireless communication channel at intervals equal to the FIFS plus the back-off time assigned to the wireless communication apparatus STA3.

In the present embodiment, as described above, when a wireless communication apparatus 300 having right to transmit data in a TPP has data to transmit, the wireless communication apparatus 300 practices the transmission right. However, when the wireless communication apparatus 300 having right to transmit data in the TPP has no data to transmit, the wireless communication apparatus 300 renounces the transmission right and another wireless communication apparatus can acquire transmission right.

The timing of transmitting a beacon by each wireless communication apparatus 300 is controlled in a similar manner to the second embodiment so as to avoid a collision with a beacon transmitted in a super frame by another wireless communication apparatus 300. That is, each wireless communication apparatus 300 starts transmission of a beacon at the exact or nearly exact center of a longest beacon interval of those of receivable beacons. In the super frame, a plurality of beacons or similar signals may be transmitted. In this case, when a beacon or a similar signal is transmitted from a wireless communication apparatus 300, a period with a predetermined length immediately following the transmission may be assigned as a TPP to the wireless communication apparatus 300 that transmitted the beacon. This allows it to provide a plurality of TTPs in a super frame for use by the wireless communication apparatus 300.

The operation of the wireless communication apparatus 300 according to the third embodiment is explained below.

Figure 15:
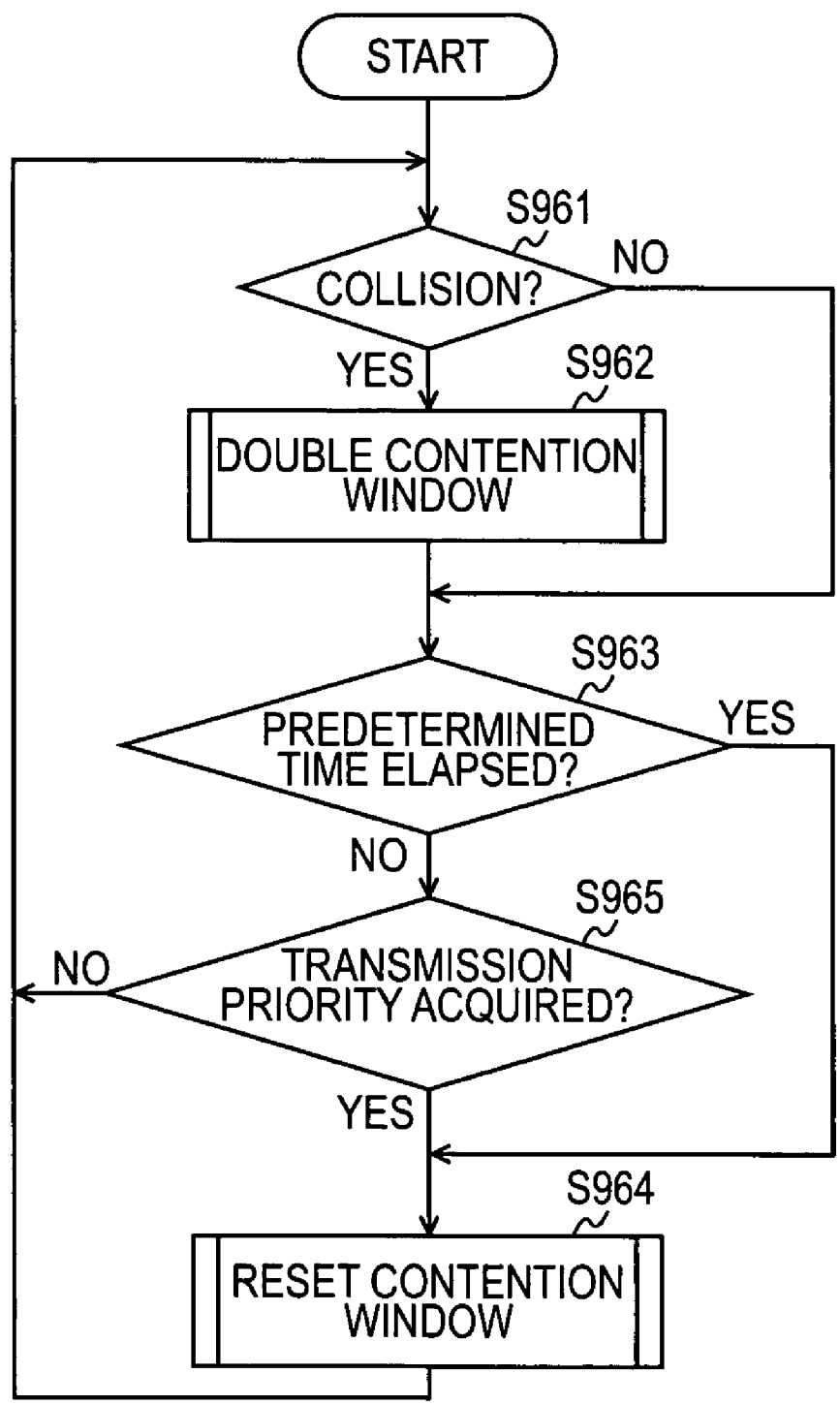
FIG. 15 is a flow chart showing a contention window initialization process performed by a contention window controller according to an embodiment of the present invention.

With reference to FIG. 15, a process performed by the wireless communication apparatus 300 to initialize the contention window is described below. Note that the process associated with the initialization of the contention window is controlled by the contention window controller 360 as in the first and second embodiments described above.

First, the receiving unit 350 determines, based on received signals, whether there is a collision among data (step S961). If a collision among data is detected (that is, if the answer to step S961 is YES), the contention window controller 360 doubles the contention window held by the contention window holding unit 310 (step S962). Then a judgment is made as to whether the contention window reset counter 370 has counted the particular time (step S963).

In a case in which no data collision is detected (that is, when the answer to step S961 is NO), the contention window controller 360 determines whether the contention window reset counter 370 has counted the predetermined time (step S963). If the particular time has been counted by the contention window reset counter 370 (that is, if the answer to step S963 is YES), the contention window controller 360 resets the contention window held by the contention window holding unit 310 to the initial value (step S964).

Even when the time counted by the contention window reset counter 370 has not yet reached the predetermined value (that is, when the answer to step S963 is NO), the contention window controller 360 determines whether preferential transmission right (step S965). If the present wireless communication apparatus 300 has acquired preferential transmission right (that is, if the answer to step S965 is YES), the contention window controller 360 resets the contention window held by the contention window holding unit 310 to the initial value (step S964).

The contention window controller 360 performs repeatedly the above-described process, that is, if a data collision occurs, the contention window controller 360 doubles the contention window value held by the contention window holding unit 310, and initializes the contention window value each when the predetermined time is counted by the contention window reset counter 370 or when preferential transmission right is given to the present wireless communication apparatus 300.

Figure 16:
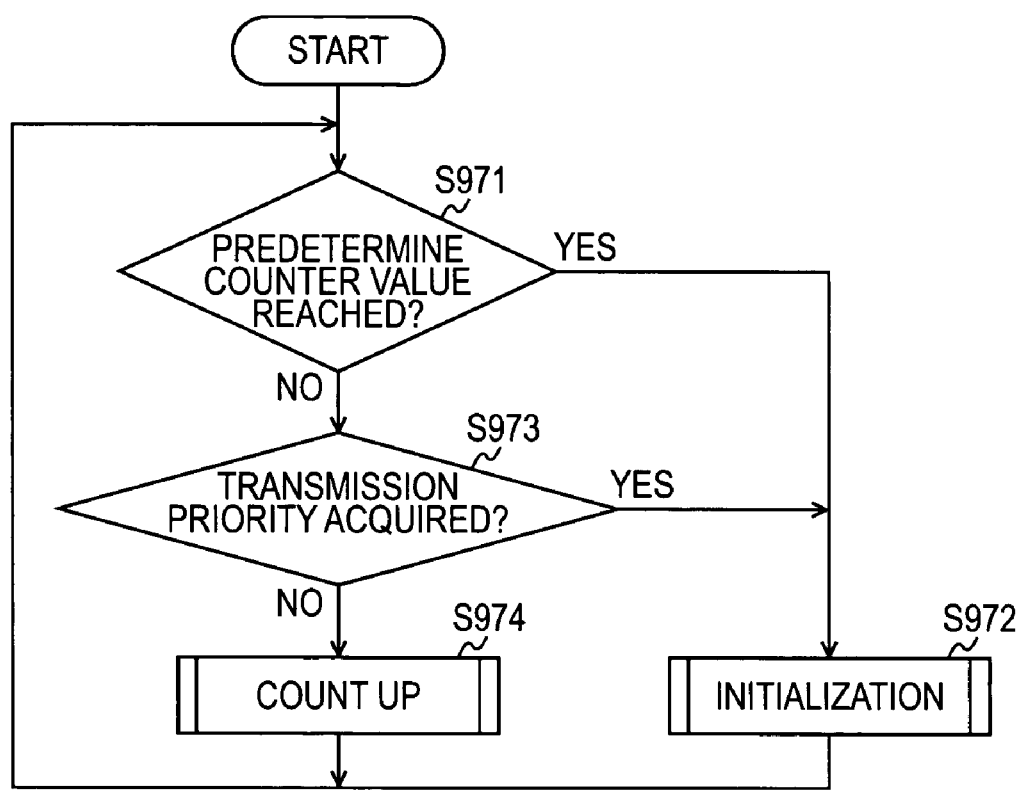
FIG. 16 is a flow chart showing a process of initializing a contention window reset counter according to an embodiment of the present invention.

Now, with reference to FIG. 16 the operation of the contention window reset counter 370 is explained. FIG. 16 shows a flow chart of the operation of the contention window reset counter 370 configured in the form of a count-up timer.

First, a determination is made as to whether the value counted up by the contention window reset counter 370 has reached a predetermined value (step S971). If the counted-up value has reached the predetermined value (the answer to step S971 is YES), the contention window reset counter 370 is initialized. (step S972).

When the value counted up by the contention window reset counter 370 has not yet reached the predetermined value (the answer to step S971 is NO), the transmission priority determination unit 390 determines whether the present wireless communication apparatus 300 has acquired preferential transmission right (step S973). If the present wireless communication apparatus 300 has acquired preferential transmission right (the answer to step S973 is YES), the contention window reset counter 370 is initialized (step S972). If the present wireless communication apparatus 300 does not have preferential transmission right (the answer to step S973 is NO), counting-up is performed repeatedly (step S974) until the value counted up by the contention window reset counter 370 has reached the predetermined value (that is, until the answer to step S971 becomes YES) or until the present wireless communication apparatus 300 has acquired preferential transmission right (that is, until the answer to step S973 becomes YES).

In this third embodiment, as described above, unlike the conventional technique in which the contention window value is initialized in response to receiving an ACK signal after a success in retransmission of data, the contention window is initialized when the value counted by the contention window reset counter 370 has reached the predetermined value or the present wireless communication apparatus 300 has acquired preferential transmission right. Thus, the contention window is periodically initialized so that the data transmission intervals are properly controlled depending on the total traffic of the system so as to achieve an increase in the overall throughput of the system.

Furthermore, because the contention window is initialized when preferential transmission right is given to the present wireless communication apparatus 300, it is possible to transmit data in a highly efficient manner even when the data is transmitted at intervals equal to the sum of the SIFS and the back-off time.

Furthermore, because the contention window is initialized before an occurrence of a TPP in which preferential transmission right is given to a wireless communication apparatus, the back-off time in an FAP following the TPP is set depending on the contention window with the initial value CWmin. However, data to be transmitted has been transmitted in the TPP, the probability of an occurrence of a data collision is low even if the back-off time is set to a small value, and thus the system can have high overall throughput.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus for communicating on a radio communication channel, comprising:
    means for storing a random number range;
    means for setting a back-off time, during which the wireless communication apparatus does not transmit data on the radio communication channel, based on the random number range;
    means for counting down the back-off time upon a determination that the radio communication channel is not being used;
    means for transmitting data on the radio communication channel when counting down of the back-off time is completed;
    means for counting down a reset time; and
    control means for:
        expanding the random number range when the transmitted data collides with other data on the radio communication channel, and
        resetting the random number range when the reset time has been counted down.

2. The wireless communication apparatus according to claim 1, wherein the reset time is set depending on the number of wireless communication apparatus existing on a wireless communication network and performing communication on the radio communication channel.

3. A wireless communication apparatus for communicating on a radio communication channel, comprising:
    means for storing a random number range;
    means for setting a back-off time, during which the wireless communication apparatus does not transmit data on the radio communication channel, based on the random number range;
    means for counting down the back-off time upon a determination that the radio communication channel is not being used;
    means for generating a beacon at predetermined time intervals to inform other wireless communication apparatus in a wireless communication network of the presence of the wireless communication apparatus on the wireless communication network;
    means for counting down a reset time;
    means for transmitting the beacon at the predetermined intervals and for transmitting data on the radio communication channel when counting of the back-off time is completed; and
    control means for:
        expanding the random number range when the transmitted data collides with other data on the radio communication channel, and
        resetting the random number range when the beacon is transmitted or when counting down of the reset time is completed.

4. The wireless communication apparatus according to claim 3, wherein the means for counting down the reset time is reset when the reset time has been counted down or when the beacon is transmitted.

5. The wireless communication apparatus according to claim 3, wherein the reset time is set depending on the number of other wireless communication apparatus existing on the wireless communication network.

6. The wireless communication apparatus according to claim 5, wherein the beacon includes information indicating the number of other wireless communication apparatus existing on the wireless communication network.

7. A first wireless communication apparatus adapted to perform wireless communication over a wireless communication network based on a distribution coordination function providing a first transmission period in which the first wireless communication apparatus has a right to transmit data on the wireless communication network, and providing a second transmission period in which the wireless communication apparatus competes with a second wireless communication apparatus to transmit data on the wireless communication network, the first wireless communication apparatus comprising;
    means for storing a random number range;
    means for setting a back-off time, during which the first wireless communication apparatus does not transmit data on a radio communication channel, based on the random number range;
    means for counting down the back-off time upon a determination that the radio communication channel is not being used;
    means for, in the second transmission period, transmitting data on the radio communication channel when counting down of the back-off time is completed;
    means for counting down a reset time; and
    control means for;
        expanding the random number range when the transmitted data collides with another other data on the radio communication channel, and
        resetting the random number range when the first wireless communication apparatus is given the right to communicate data on the wireless communication network or when count down of the reset time is completed.

8. The wireless communication apparatus according to claim 7, wherein the means for counting down a back-off time is reset when the back-off time has been counted down or when the first wireless communication apparatus is given the right to communicate data on the wireless communication network.

9. The wireless communication apparatus according to claim 7, wherein the reset time is set depending on the number of other wireless communication apparatus existing on the wireless communication network.

10. A method of a wireless communication apparatus for communicating on a radio communication channel, comprising:
    storing a random number range;
    setting a back-off time, during which the wireless communication apparatus does not transmit data on the radio communication channel, based on the random number range;
    counting down the back-off time upon a determination that the radio communication channel is not being used;

transmitting data on the radio communication channel when counting down of the back-off time is completed;
counting down a reset time;
expanding the random number range when the transmitted data collides with other data on the radio communication channel; and
resetting the random number range when the reset time has been counted down.

11. A computer-readable storage medium storing a program that, when executed by a wireless communication apparatus, causes the wireless communication apparatus to perform a method for communicating on a radio communication channel, the method comprising:
storing a random number range;
setting a back-off time, during which the wireless communication apparatus does not transmit data on the radio communication channel, based on the random number range;
counting down the back-off time upon a determination that the radio communication channel is not being used;
transmitting data on the radio communication channel when counting down of the back-off time is completed;
counting down a reset time;
expanding the random number range when the transmitted data collides with other data on the radio communication channel; and
resetting the random number range when the reset time has been counted down.

12. A wireless communication apparatus for communicating on a radio communication channel, comprising:
a random number range storing unit configured to store a random number range;
a back-off time setting unit configured to set a back-off time, during which the wireless communication apparatus does not transmit data on the radio communication channel, based on the random number range;
a back-off time counting unit configured to count down the back-off time upon a determination that the radio communication channel is not being used;
a transmitting unit configured to transmit data on the radio communication channel when counting down of the back-off time is completed;
a reset time counting unit configured to count down a reset time; and
a random number range control unit configured to:
expand the random number range when the transmitted data collides with other data on the radio communication channel, and
resetting the random number range when the reset time has been counted down.

13. A wireless communication apparatus for communicating on a radio communication channel, comprising:
a random number range storing unit configured to store a random number range;
a back-off time setting unit configured to set a back-off time, during which the wireless communication apparatus does not transmit data on the radio communication channel, based on the random number range;
a back-off time counting unit configured to count down the back-off time upon a determination that the radio communication channel is not being used;
a beacon information generation unit configured to generate a beacon at predetermined time intervals to inform other wireless communication apparatus in a wireless communication network of the presence of the wireless communication apparatus on the wireless communication network;
a reset time counting unit configured to count down a reset time;
a transmitting unit configured to transmit the beacon at the predetermined intervals and to transmit data on the radio communication channel when counting down of the back-off time is completed; and
a random number range control unit configured to:
expand the random number range when the transmitted data collides with other data on the radio communication channel, and
reset the random number range when the the beacon is transmitted or when counting down of the reset time is completed.

* * * * *